United States Patent [19]
Steele et al.

[11] Patent Number: 5,742,779
[45] Date of Patent: Apr. 21, 1998

[54] METHOD OF COMMUNICATION USING SIZED ICONS, TEXT, AND AUDIO

[75] Inventors: Richard D. Steele, Palo Alto; Robert F. Gonsalves, Pleasanton; Larry J. Leifer, Stanford, all of Calif.

[73] Assignee: Tolfa Corporation, Palo Alto, Calif.

[21] Appl. No.: 627,051

[22] Filed: Apr. 3, 1996

Related U.S. Application Data

[63] Continuation of Ser. No. 458,851, Jun. 2, 1995, abandoned, which is a continuation of Ser. No. 791,938, Nov. 14, 1991, abandoned.

[51] Int. Cl.⁶ .................................................. G06F 3/00
[52] U.S. Cl. ...................... 345/349; 345/439; 345/978
[58] Field of Search ........................... 395/326–358, 395/139, 119–127; 345/117–120, 121, 131, 127–130, 146, 157; 434/112, 116, 118, 169, 307 R; 273/454; 341/21, 28

[56] References Cited

U.S. PATENT DOCUMENTS

| | | | |
|---|---|---|---|
| 4,559,598 | 12/1985 | Goldwasser et al. | 364/419.1 |
| 4,656,603 | 4/1987 | Dunn | 395/161 X |
| 4,819,189 | 4/1989 | Kikuchi et al. | 395/158 |
| 4,823,303 | 4/1989 | Terasawa | 395/147 |
| 4,868,766 | 9/1989 | Oosterholt | 395/161 X |
| 4,974,173 | 11/1990 | Stefik et al. | 395/159 |
| 5,001,697 | 3/1991 | Torres | 395/157 X |
| 5,065,347 | 11/1991 | Pajak et al. | 395/159 |
| 5,093,907 | 3/1992 | Hwong et al. | 395/152 |
| 5,119,079 | 6/1992 | Hube et al. | 395/146 |
| 5,169,342 | 12/1992 | Steele et al. | 434/112 |
| 5,202,961 | 4/1993 | Mills et al. | 395/159 |
| 5,218,672 | 6/1993 | Morgan et al. | 395/161 X |
| 5,237,648 | 8/1993 | Mills et al. | 395/152 X |
| 5,276,785 | 1/1994 | Mackinlay et al. | 395/127 |
| 5,287,448 | 2/1994 | Nicol et al. | 395/159 |
| 5,295,243 | 3/1994 | Robertson et al. | 395/160 |
| 5,303,383 | 4/1994 | Kreitman et al. | 395/159 |
| 5,325,481 | 6/1994 | Hunt | 395/159 |
| 5,333,254 | 7/1994 | Robertson | 395/155 |
| 5,347,628 | 9/1994 | Brewer | 395/159 |

OTHER PUBLICATIONS

Advance Interface Design Guide, IBM, Jun. 1989, pp. 17–22.
Foss, "Tools for Reading and Browsing Hypertext", Information Processing & Management, 1989, pp. 407–418.
Tonomura et al, "Content Oriented Visual Interface Using Video Icons for Visual Database Systems", IEEE Workshop, Oct. 1989, pp. 68–73.
Lieberman, "A Three–Dimensional Representation for Program Execution", IEEE, 1989, pp. 111–116.
Tomlin, "Sound Master v1.5", 1990, pp. 1–2.
Myers, "A taxonomy of Window Manager User Interfaces", IEEE Comp. Graphics & Appl., Sep./1988, pp. 65–84.
Macintosh System Software User's Guide v6.0, Apple Corp., 1988, pp. 14–43, 148–150.
Hsia et al, "Construction and Manipulation of Dynamic Icons", IEEE, 1988, pp. 78–83.
Microsoft Windows User'Guide, Microsoft Corp., 1990, pp. 16–27, 70–71, 144–157.

(List continued on next page.)

*Primary Examiner*—John E. Breene
*Attorney, Agent, or Firm*—Limbach & Limbach LLP; Ronald L. Yin

[57] ABSTRACT

Language oriented information is communicated to and from a user by the use of a computer with a dynamic graphics display, having a pointing device for visually indicating a position through a cursor on the display. Various embodiments of the method include calling an icon to attention when the cursor is positioned on the icon, auto projecting an icon when it is activated, changing the icon image to denote its terminal node status, varying the play back speed of the audio/visual aspect of an icon, moving among different layers of a hierarchical database, and text searching and matching with icons.

20 Claims, 34 Drawing Sheets

2. Cursor disappears. Icon and enclosed image both enlarge for specified period of time. In our software, enlargement = 2x2, for period of ca. 3 seconds.

OTHER PUBLICATIONS

HyperCard User's Guide, Apple Corp., 1988, pp. 1–161; 185–195.

"Computer–Based Visual Communication in Aphasia" by R.D. Steele et al., *Neuropsychologia,* vol. 27, pp. 409–426 (1989).

"Recipe Preparation by a Severely Impaired Aphasic Using the C–VIC 2.0 Interface", by R.D. Steele et al., in *RESNA'89: Pro. of the 12 Ann. Conf. of the Assoc. for the Advancement of Rehab. and Assistive Techn.,* pp. 218–219 (1989).

"Evaluation Performance of Severely Aphasic Patients on a Computer–Aided Visual Communication System" by R.D. Steele et al., *Clinical Aphasiiology,* BRK Publ., MN, pp. 46–54 (1987).

"Processing of Visual Syntax in a Globally Aphasic Patient" by M. Weinrich et al., *Brain and Language,* vol. 36 pp. 391–405 (1989).

"Representations of 'Verbs' in a Computerized Visual Communications System" by M. Weinrich et al., *Aphasiology,* vol. 3, pp. 501–512 (1989).

"Computer Interface for Severe Language Disability" by C. Goodenough–Trepagnier, 1989.

MacDraw Pro, Claris Corp, 1991, Chpt. 3.

Fujii et al, "Features and a Model for Icon Morphological Transformation", IEEE Oct./1991, pp. 240–245.

Desk Set Environment Reference Guide, Sun Microsystems, Inc., 1990, pp. 1–11, 189–211.

Hirukawa et al, "An Iconic Programming System, HI–Visual", IEEE, 1990, pp. 1178–1184.

Yoshimoto et al, "Interactive Iconic Programming Facility in HI–Visual", IEEE Workshop, 1986, pp. 34–41.

Advanced Interface Design Guide, IBM, 1989, pp. 1–43, 96–115, 167, 170–173.

Ichikawa et al, "Visual Programming", IEEE Conf., Oct./87, pp. 129–137.

Clarisse et al, "An Icon Manager in LISP", IEEE Workshop, Jun./1985, pp. 116–131.

Hirakawa et al, "A Framework for Construction of Icon Systems", IEEE, 1988, pp. 70–77.

Henry et al, "Multidimensional Icons", ACM Trans. on Graphics, Jan./1990, pp. 133–137.

Edel, "The Tinkertoy Graphical Programming Environment", IEEE, 1988, pp. 1110–1115.

IBM Tech Discl. Bull., "Three Dimensional Menu Icon to Aid Users in Understanding Hierarchy", May/1991, pp. 464–465.

FIGURE 1

Calling-to-Attention

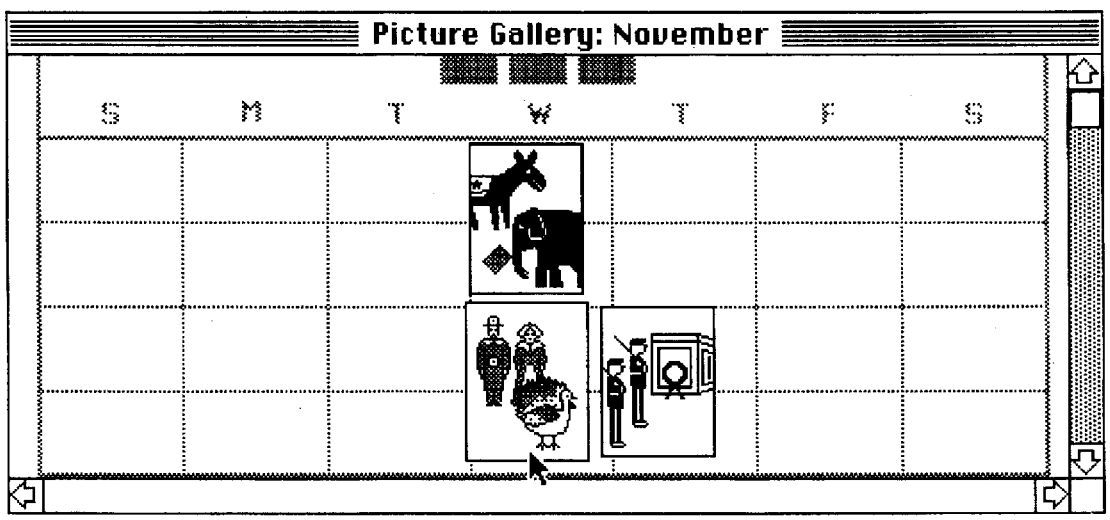

1. When the cursor lights on an icon (*e.g.*, Thanksgiving), the icon becomes larger in all directions. The icon retains its expanded borders until the cursor is removed from its enlarged area.

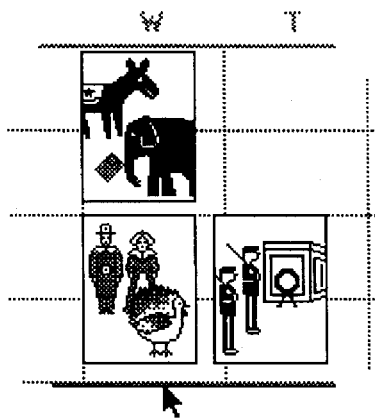

2. When the cursor is removed from the icon, it returns to its previous size (*e.g.*, Thanksgiving). Background elements, such as the gray outline of the calendar month, remain unchanged when the cursor lights on them.

(End Fig. 1)

Auto-Projection
with Standard-Frame, Static, Single-View Icons

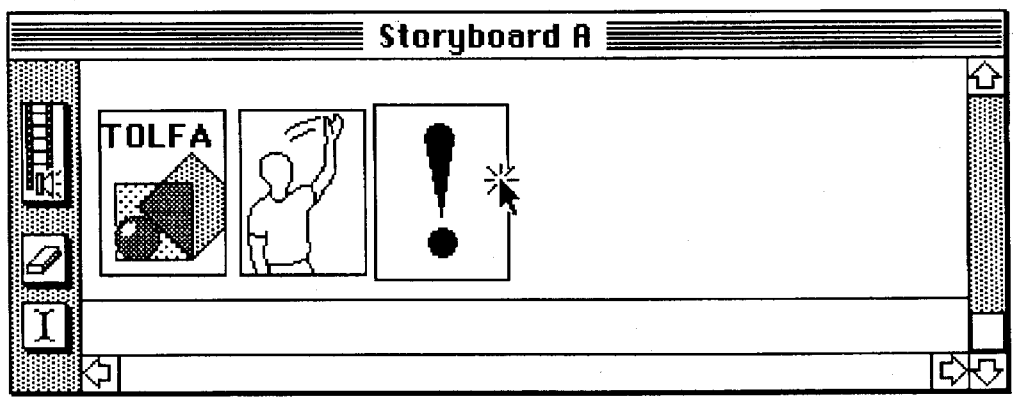

1. User positions cursor on an icon and clicks.

FIG. 2A

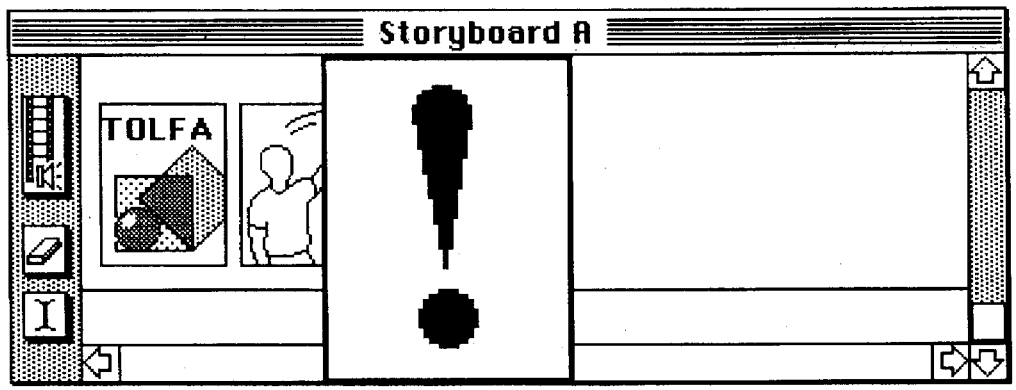

2. Cursor disappears. Icon and enclosed image both enlarge for specified period of time. In our software, enlargement = 2x2, for period of ca. 3 seconds.

FIG. 2B

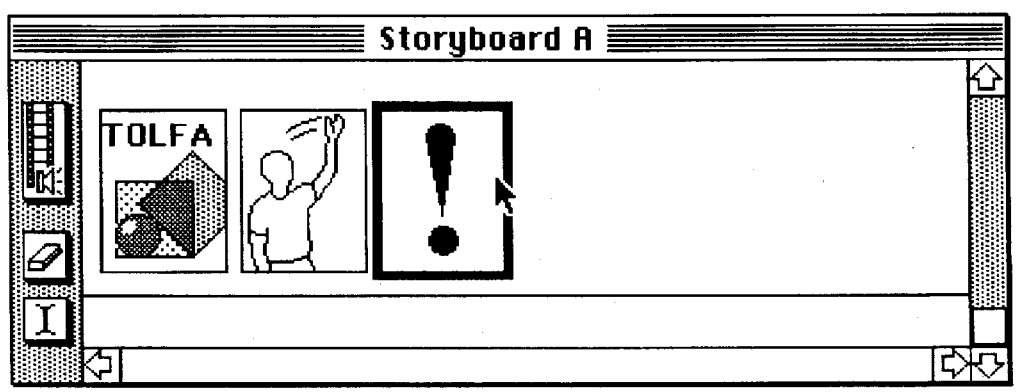

3. Cursor reappears and icon returns to initial size, but in heavy border, after specified period of time, or upon interrupting click of the user.

FIG. 2C  (cont.)

Auto-Projection
with Standard-Frame, Static, Single-View Icons

4. Clicking off-icon causes the heavy border to disappear; clicking on-icon begins the enlarged display once again.

(End Fig. 2)

Auto-Projection
with Icon Presenting Complementary Static Views

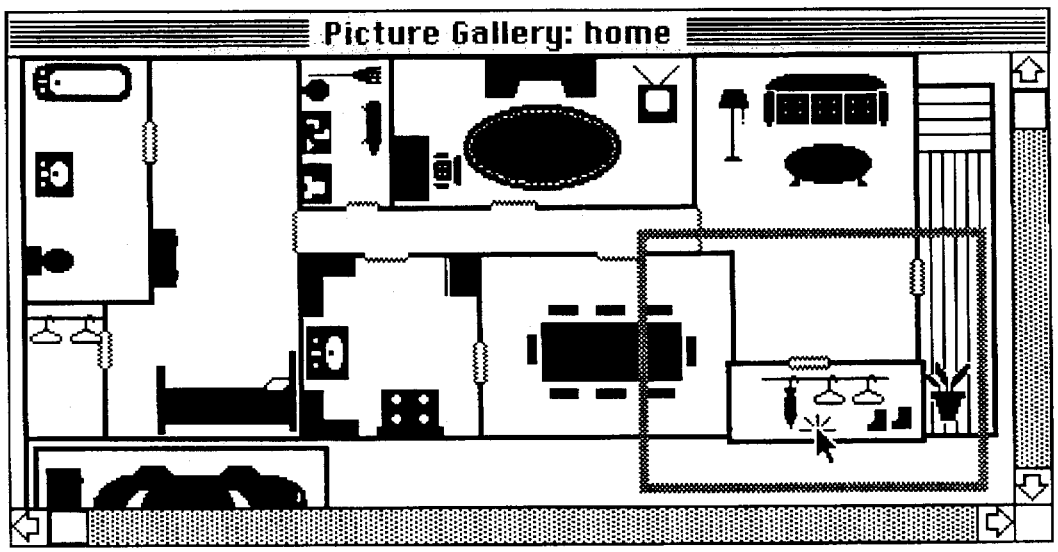

1. The user positions the cursor on an icon and clicks.   FIG. 3A

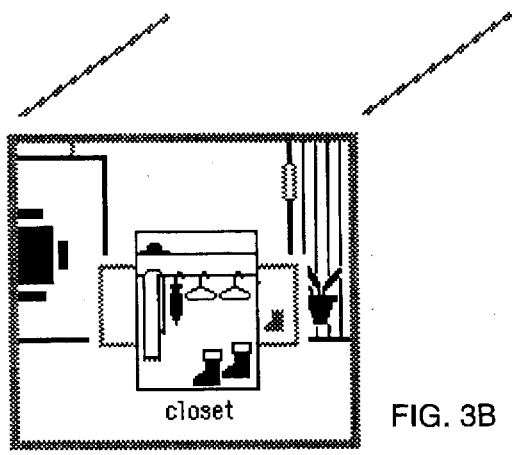

FIG. 3B

2. The cursor disappears. The original icon shape is redrawn in gray over a white mask, and a complementary view of the icon, framed in a standard size and shape frame, is superimposed centered over the original icon.

If text is being displayed (a user-selectable option), then the icon's associated gloss appears centered beneath the standard size and shape frame, as shown in the illustration above (*i.e.*, 'closet').

If speech output is ON (a user-selectable option), then the gloss associated with the icon is spoken aloud when the standard size and shape frame appears. Here, a voice would say the word "CLOSET".

(cont.)

Auto-Projection
with Icon Presenting Complementary Static Views

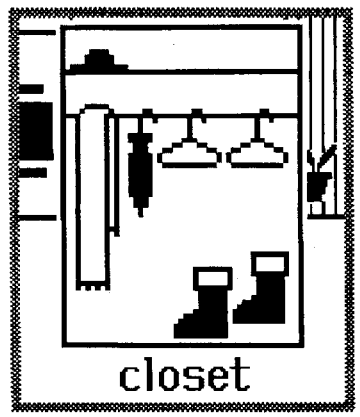
FIG. 3C

3. The icon and enclosed image both enlarge for a specified period of time, and are drawn over a slightly larger white mask. In our program, enlargement = 2x2, and the period of enlarged display is approximately 3 seconds. The text of the gloss, if displayed, is enlarged along with the icon.

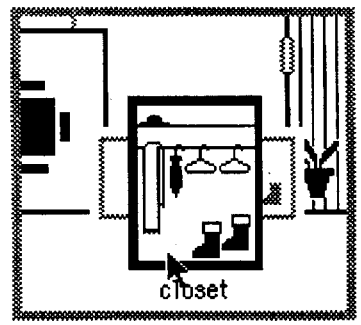
FIG. 3D

4. The cursor reappears, and the icon returns to the standard framed version, but in a heavy border, after a specified period of time or upon interrupting click by user.

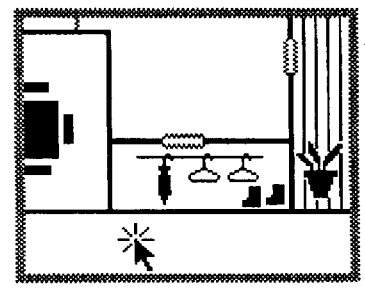
FIG. 3E

5. Clicking off-icon then causes the original icon to be restored.

(End Fig. 3)

Auto-Projection
with Standard-Frame, Animated Icons

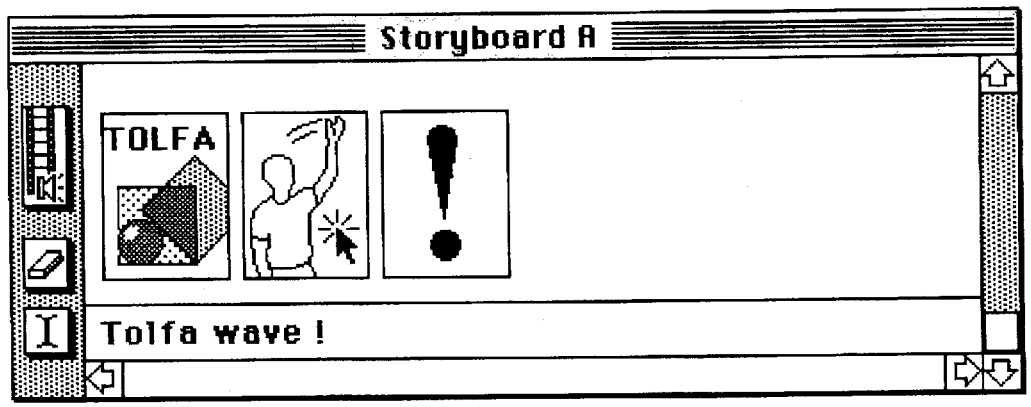

1. User positions cursor on an icon and clicks.

FIG. 4A

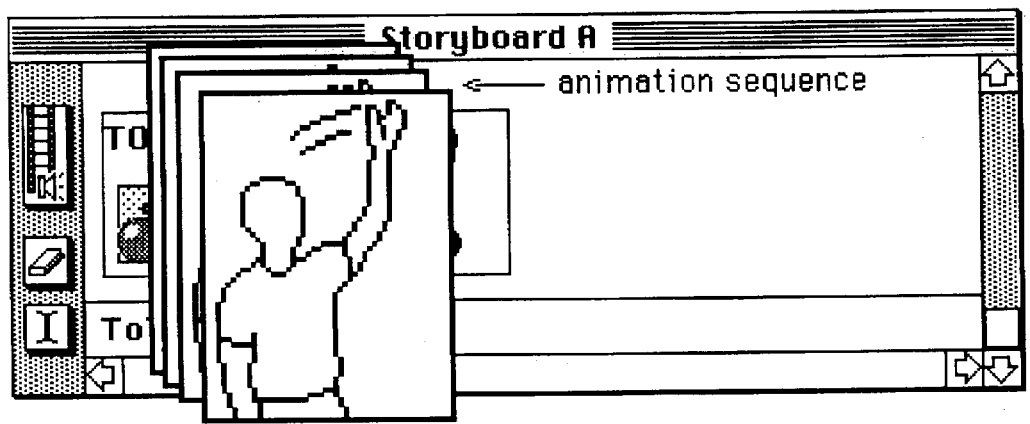

2. Cursor disappears. Icon and enclosed image both enlarge for specified period of time. Multiple images are displayed in rapid succession, creating the illusion of motion.

FIG. 4B

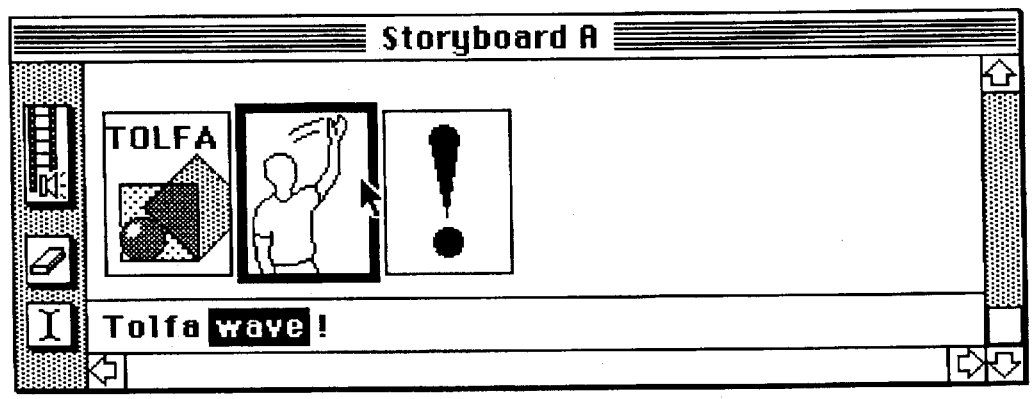

3. Icon returns to initial size, but in heavy border, after specified period of time, or upon interrupting click of the user. Associated gloss appears in reverse video.

FIG. 4C (cont.)

Auto-Projection
with Standard-Frame, Animated Icons

4. Clicking off-icon causes the heavy border to disappear; gloss reappears as black on white. Clicking on-icon begins the enlarged display once again.

(End Fig. 4)

Graying Out
to Indicate a Terminal Data-Tree Node

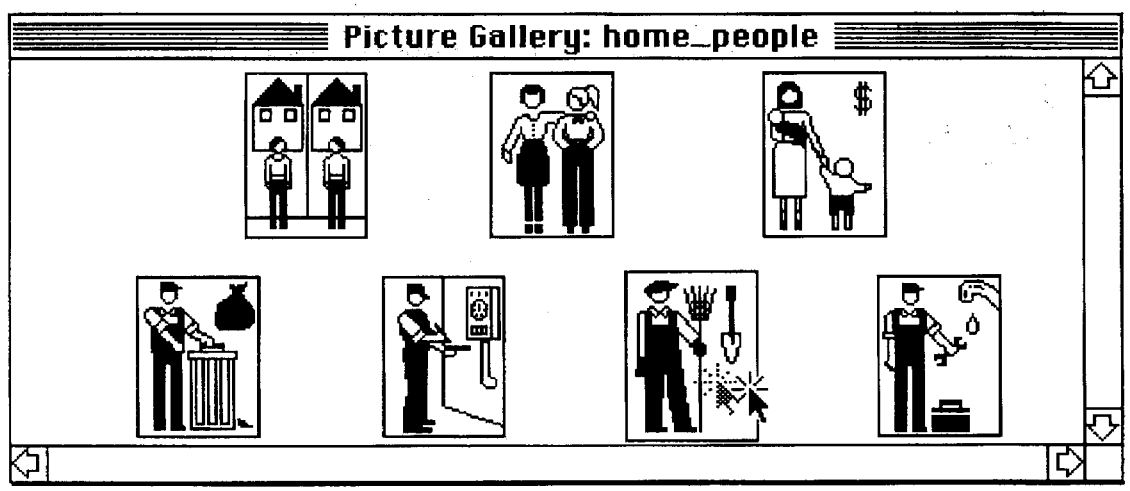

1. The user double-clicks on an icon to open it and display other icons which are beneath it in the data tree structure.

FIG. 5A

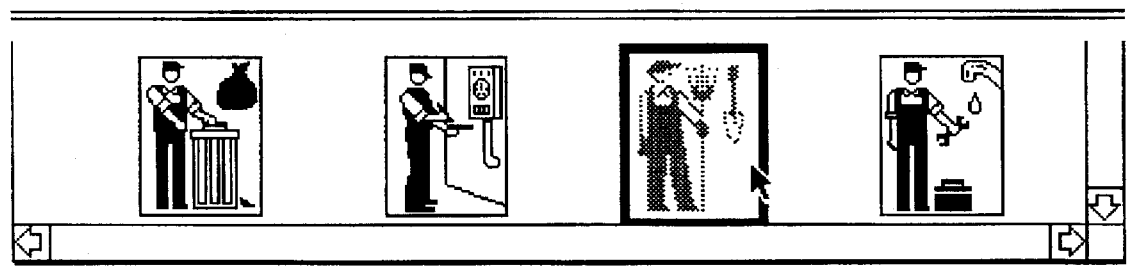

2. The icon is surrounded by a heavy black border; it then turns gray to indicate that it is a terminal node (nothing beneath it), and remains gray for a specified period of time or until interrupted by a click from the user. In our program, if uninterrupted an icon remains gray for ca. 1 sec.

FIG. 5B

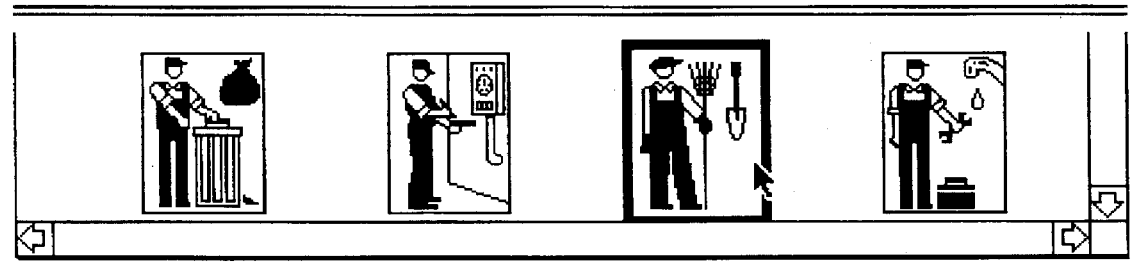

3. The icon is restored to black after the specified period of time has elapsed, or in response to an interrupting click by the user. It remains surrounded by the heavy black border to indicate it is the most recently selected icon.

FIG. 5C (cont.)

Graying Out
to Indicate a Terminal Data-Tree Node

4. The heavy black border disappears when the mouse is clicked elsewhere — an indication that the user's attention has shifted to another part of the screen.

(End Fig. 5)

FIGURE 6
Variable Playback Speed

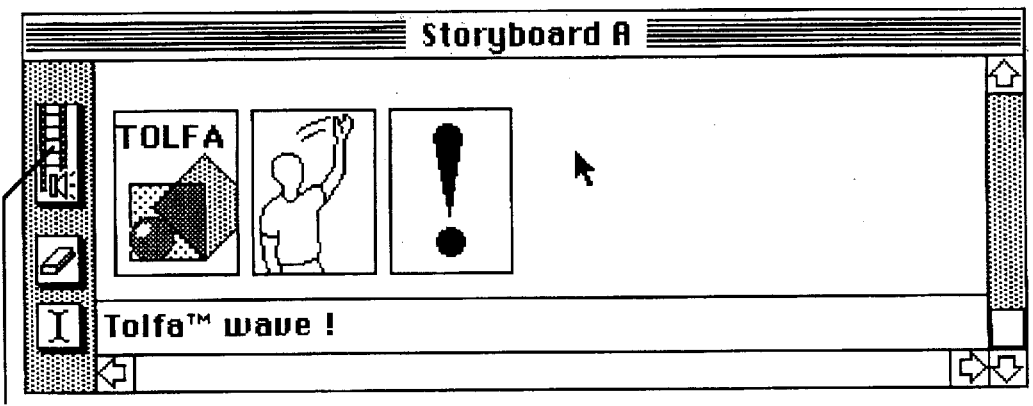

1. Playback Button: *top* — graphic display speed; *bottom* — speech display speed.

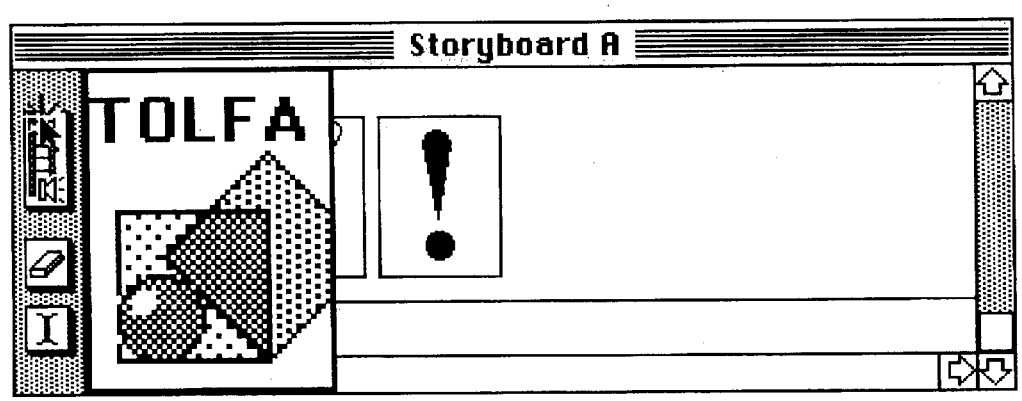

2. Clicking on the top (graphic) end of the button sets each icon to playing out its full graphic display, uninterrupted, in sequence. This rate is approximately one icon-word-concept each three seconds, which is significantly slower than speech.

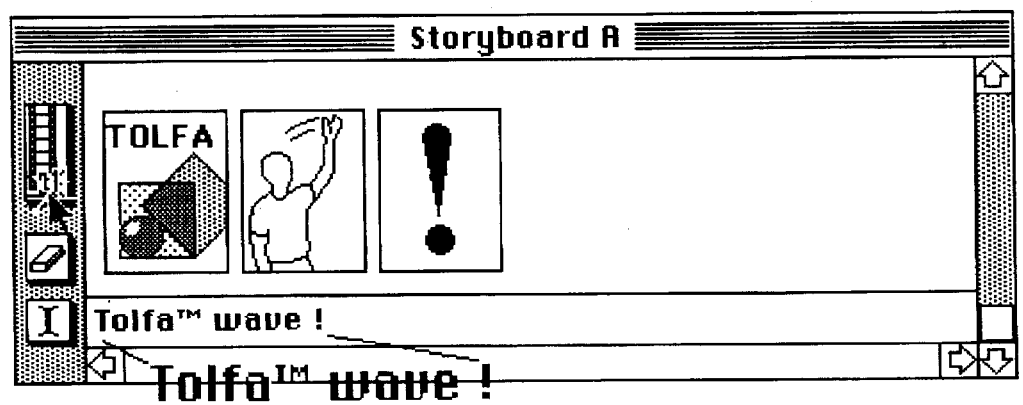

3. Clicking at the bottom (speech) end of the button sets the text to being read aloud at a few words per second — suitable for supporting communication via speech, but faster than speech-impaired users can process unfamiliar graphics.

(End Fig. 6)

Elevator
z-axis display and control

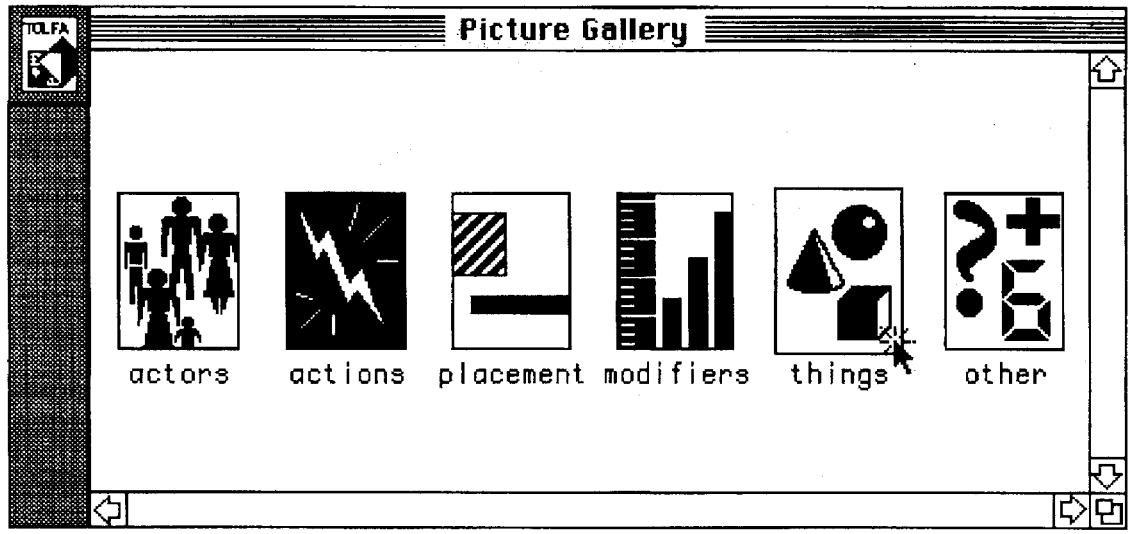

1. The vertical gray column at left provides space to display miniature versions of the icons which are "opened" as we move down the tree. Here the user is "double-clicking" on the icon for "things" to open it up.

FIG. 7A

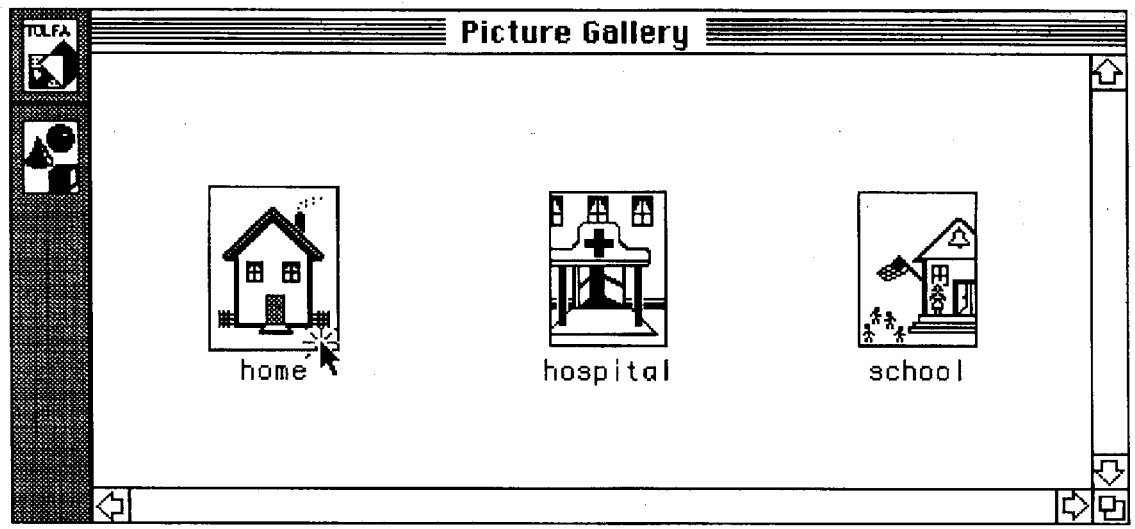

2. The "things" icon has been opened, revealing the three domains — the "home", "hospital", and "school" — within which physical things are located. A small version of the "things" icon appears in the vertical gray column at left, denoting that category's having been opened. The user is shown double-clicking here on the "home" category to open it up.

FIG. 7B (cont.)

Elevator
z-axis display and control

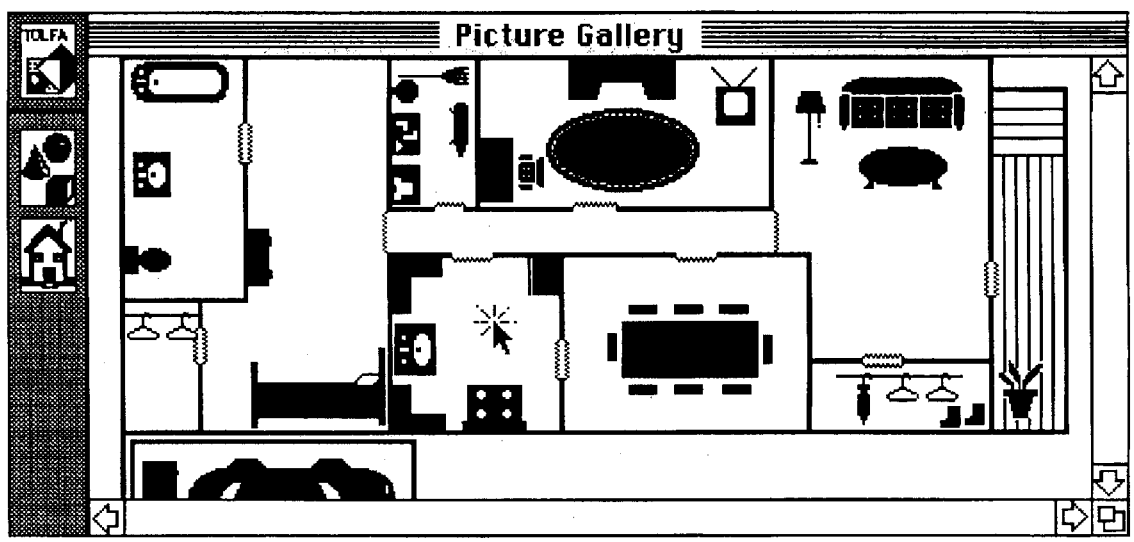

3. The "home" category has been opened, revealing the floorplan of a house. A small version of the "home" icon is posted bottommost in the vertical gray column at left, indicating that this category, too, has been opened. The user is here shown double-clicking on the "kitchen" to enter that category.

FIG. 7C

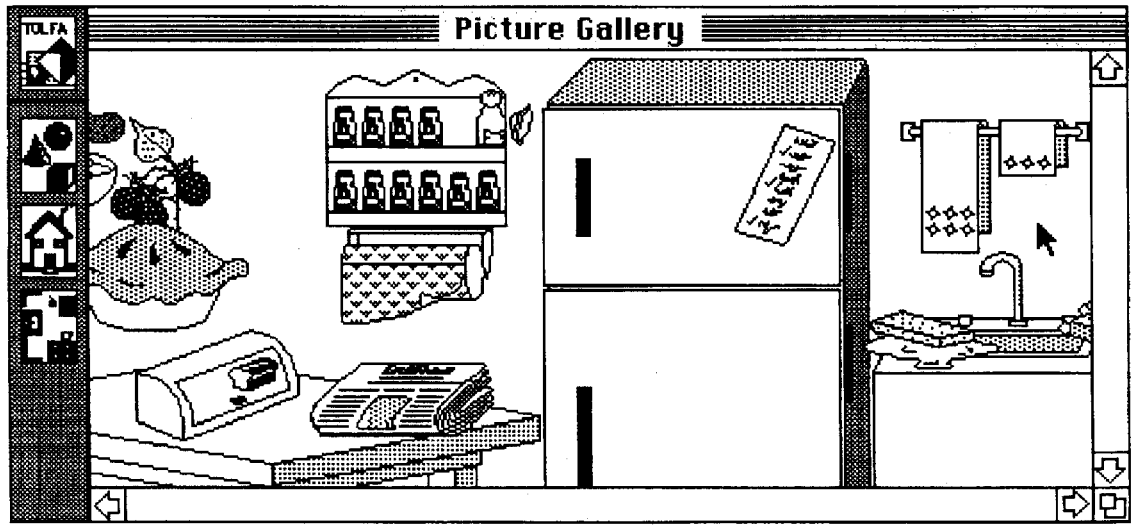

4. The "kitchen" category has been opened, and items found within the kitchen are depicted on the screen. Also, a small version of the "kitchen" icon is posted, bottommost, in the vertical gray column at the left.

FIG. 7D (cont.)

Elevator
z-axis display and control

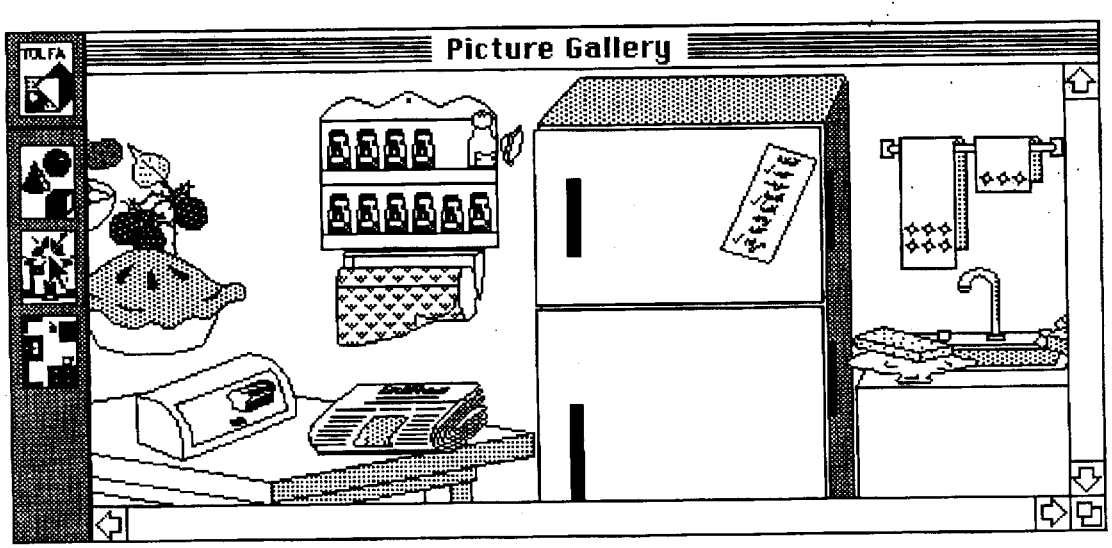

5. The user is shown here clicking on the miniature "home" icon in the vertical gray column at left, in order to ascend the data structure to the level containing this icon. This illustrates the principle that the vertical column is not only a *display* area, helping the user orient himself within the system, but also a *control* area, enabling the user to revisit efficiently previously visited levels.

FIG. 7E

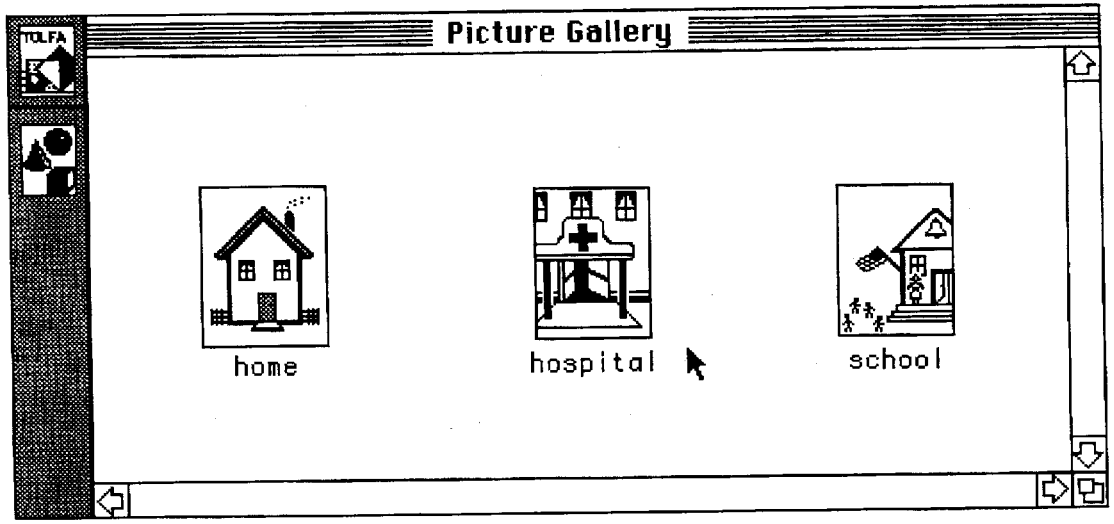

6. The data-base level containing the "home" icon is re-displayed, in response to the user's last selection. The vertical gray column at left is updated to show only those levels which lie above this level. The user is now free to open up any category at this level, either "home" (as before), or "hospital" or "school".

FIG. 7F  (End Fig. 7)

FIGURE 8A

Text Search in Graphic Domain
"CONTAINS STRING ..."

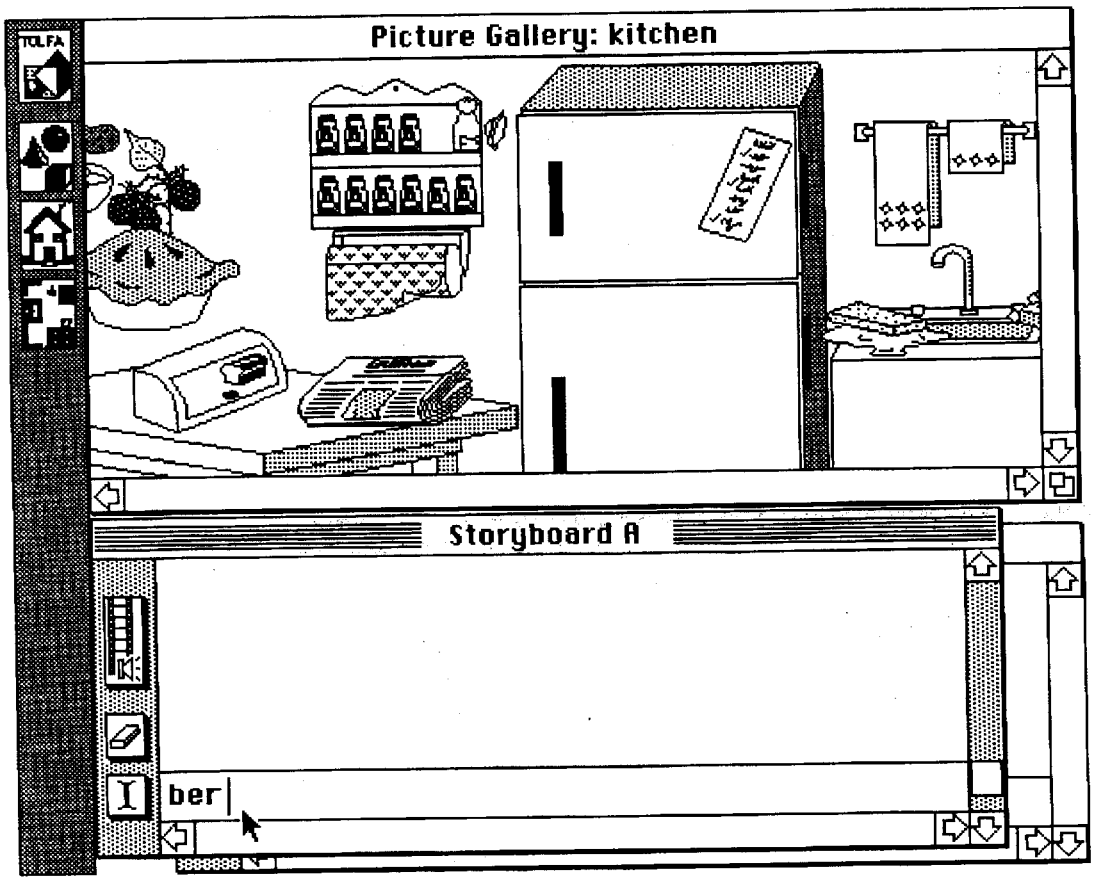

1. The user may search through a specific domain, such as the kitchen, for all the icons whose glosses contain a desired letter sequence. For example, if the user wishes to see all the various berries contained at or below the kitchen level, searching for all icons containing the letters BER may be an efficient strategy. The user types the desired letter sequence into the text area of a Storyboard, as shown below. No quotation marks are entered.

The user then hits <Carriage Return>, which launches the search. The program responds by searching through the domain displayed in the Picture Gallery — in this case, through the kitchen and all its cupboards, containers, and appliances — for icons whose glosses contain the letter sequence -BER- in any position.

(cont.)

FIGURE 8B (cont.)
Text Search in Graphic Domain
"CONTAINS STRING ..."

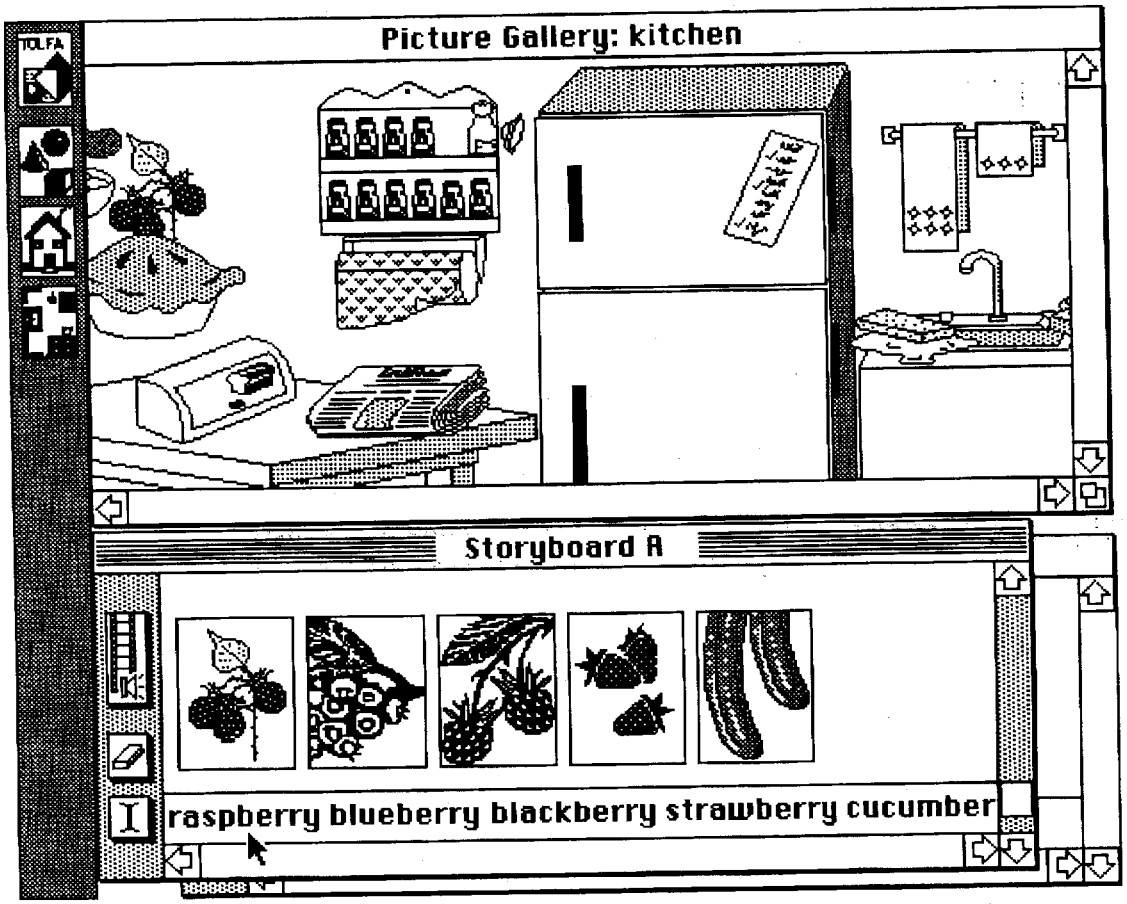

2. The program places into the Storyboard all the icons located within the domain whose glosses contain the desired letter sequence. If the text is being displayed (a user-selectable option), then the text associated with each icon is displayed in the text field. Above, the program has posted five icons found within the kitchen domain whose glosses contain the search sequence -BER-. The first four of these are berries, and the fifth is the 'cucumber', which ends in -BER. Note that the program would have posted only berries if the user had searched for the longer -BERR-, rather than just -BER-.

(End Fig. 8)

FIGURE 9A

Text Search in Graphic Domain
"BEGINS WITH ..."

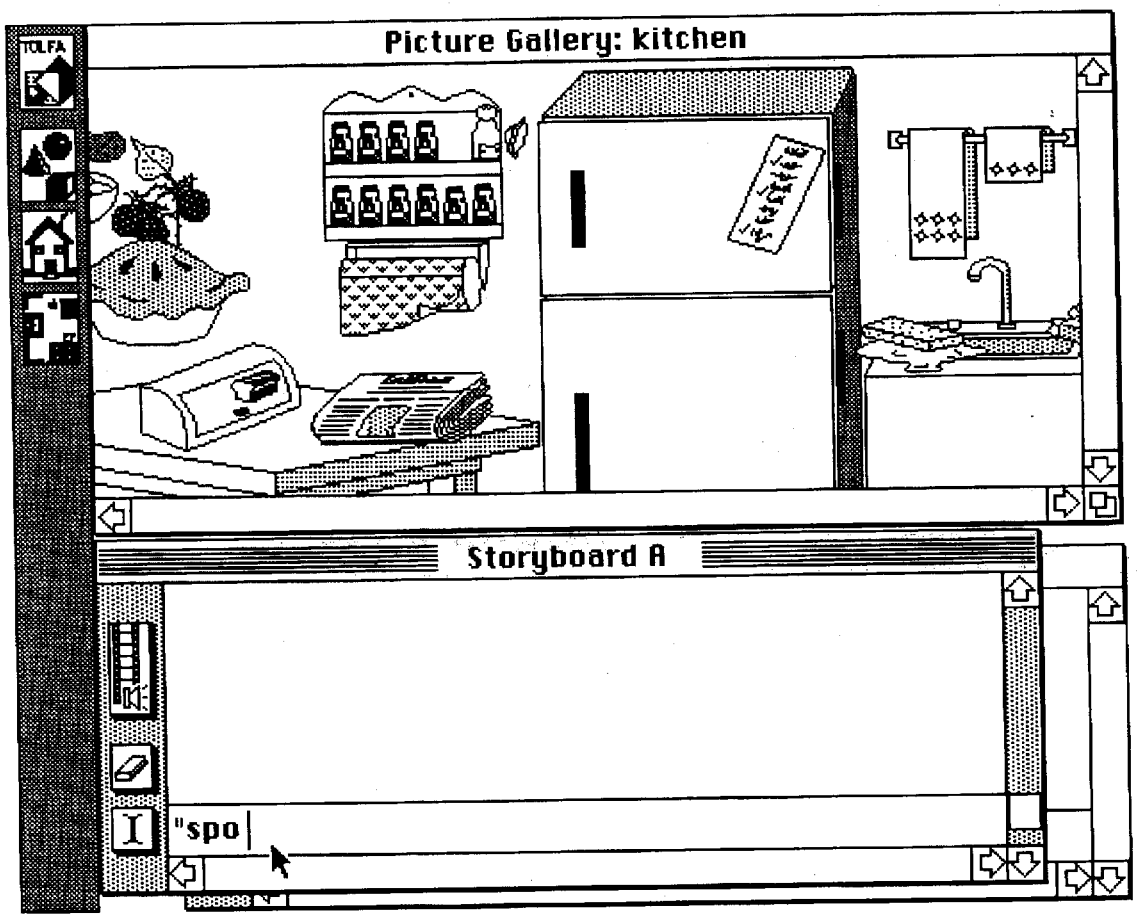

1. The user brings up the domain of the kitchen in the Picture Gallery, at top, and types a quotation mark (either single or double) followed by as many of the beginning letters of the desired word as possible. Here, the user seeks *spoon*, but can come up with only the first three letters of the word.

The user then hits the <Carriage Return>, which launches the search. In response, the program searches through the domain displayed — in this case, through the kitchen and the contents of all its various cupboards, containers, recesses, *etc.* — for icons whose glosses begin with the three letter sequence SPO-.

Text Search in Graphic Domain
"BEGINS WITH ..."

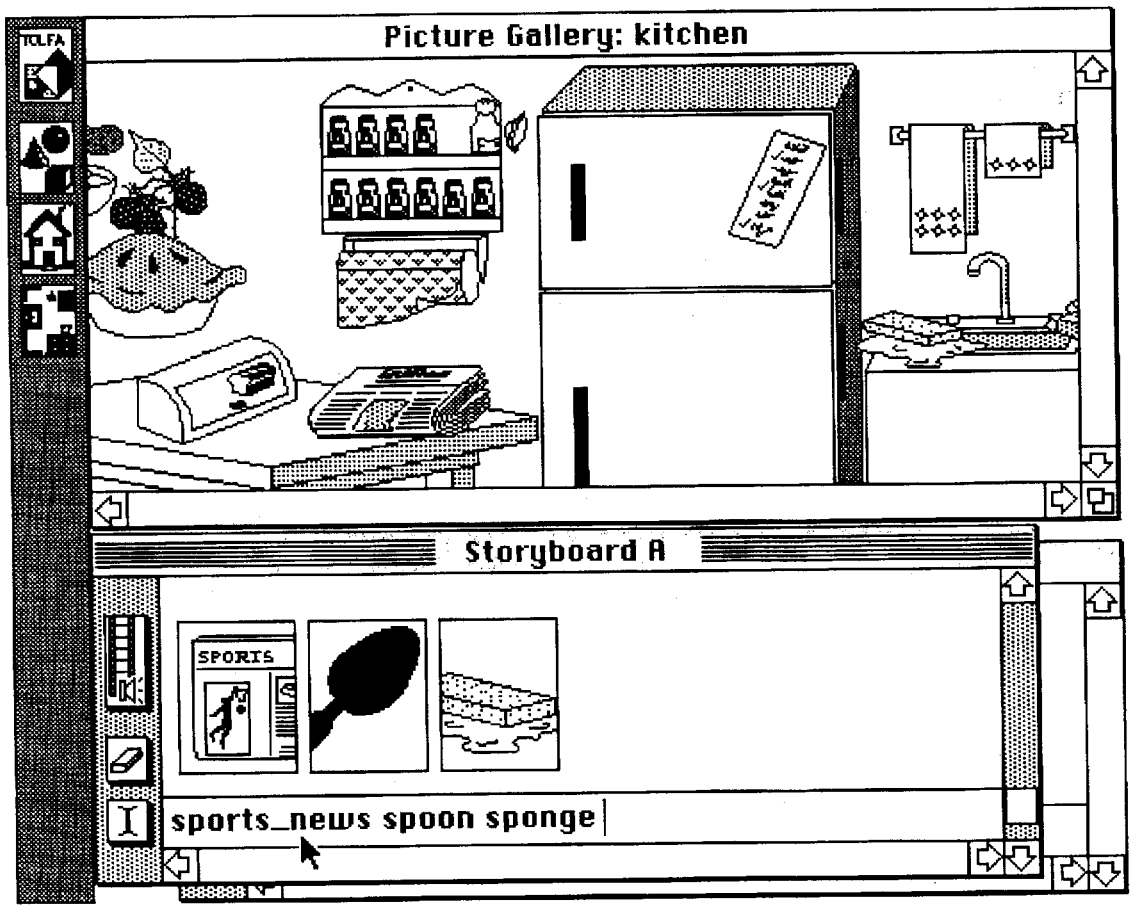

2. The program places into the Storyboard all the icons located within the domain of interest. If text is being displayed (a user-selectable option), then the text associated with each icon is displayed in the text field. Above, we show the program returning the icons for "sports_news", "spoon", and "sponge", all of which begin with "SPO". In this domain, the sponge is found atop the sink at right, and the sports news is inside the newspaper atop the table; the spoon is inside a cabinet drawer.

(End Fig. 9)

FIGURE 10A

Text Search in Graphic Domain
"EXACT MATCH"

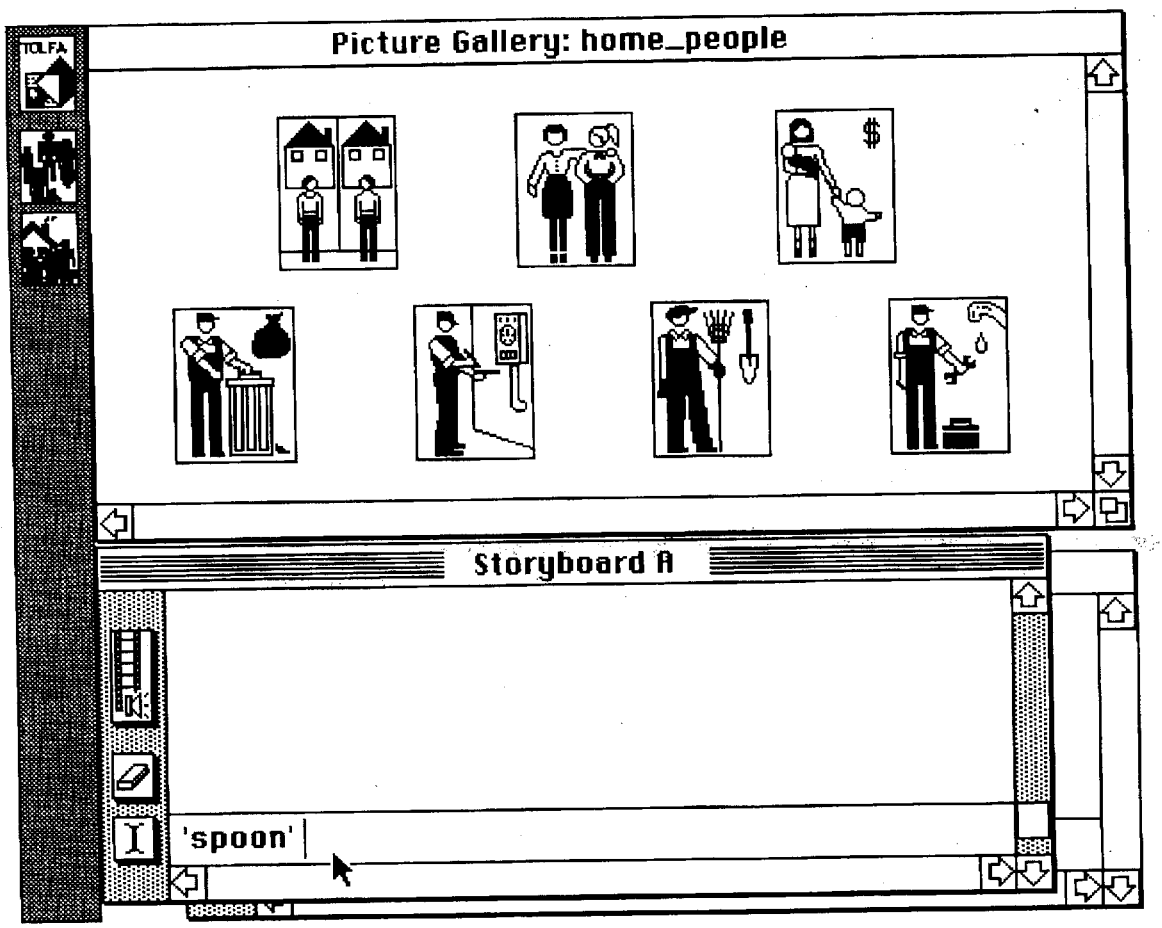

1. When the user is language-unimpaired, he or she can summon a specific icon into a Storyboard at any time by typing the gloss of that icon, exactly, between quotation marks (either single or double). Here the user is in the domain of people found in association with a home, but wishes to summon a word from a different domain, say, "spoon", from the domain of the kitchen. The user types the word *spoon* into the text area of a Storyboard, surrounded by quotation marks.

The user hits <Carriage Return> to launch the search. The program responds by searching the entire database for the icon whose gloss exactly matches the text typed between the quotation marks.

Text Search in Graphic Domain

"EXACT MATCH"

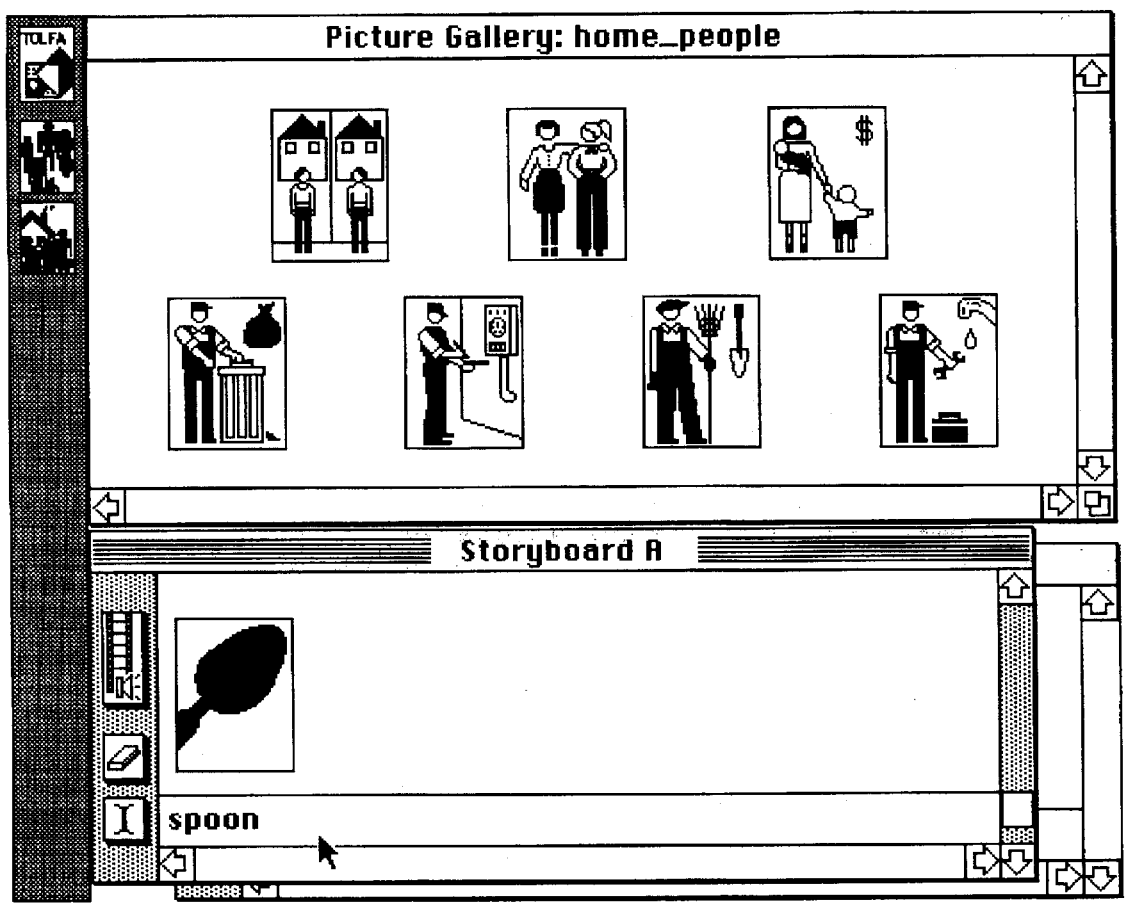

2. The program places into the Storyboard the single icon whose gloss exactly matches the text string entered by the user. If there is no such icon, the program responds by beeping once, to alert the user to the failure to find such an icon. Here the program has successfully located the "spoon" icon, and has posted it in the Storyboard.

(End Fig. 10)

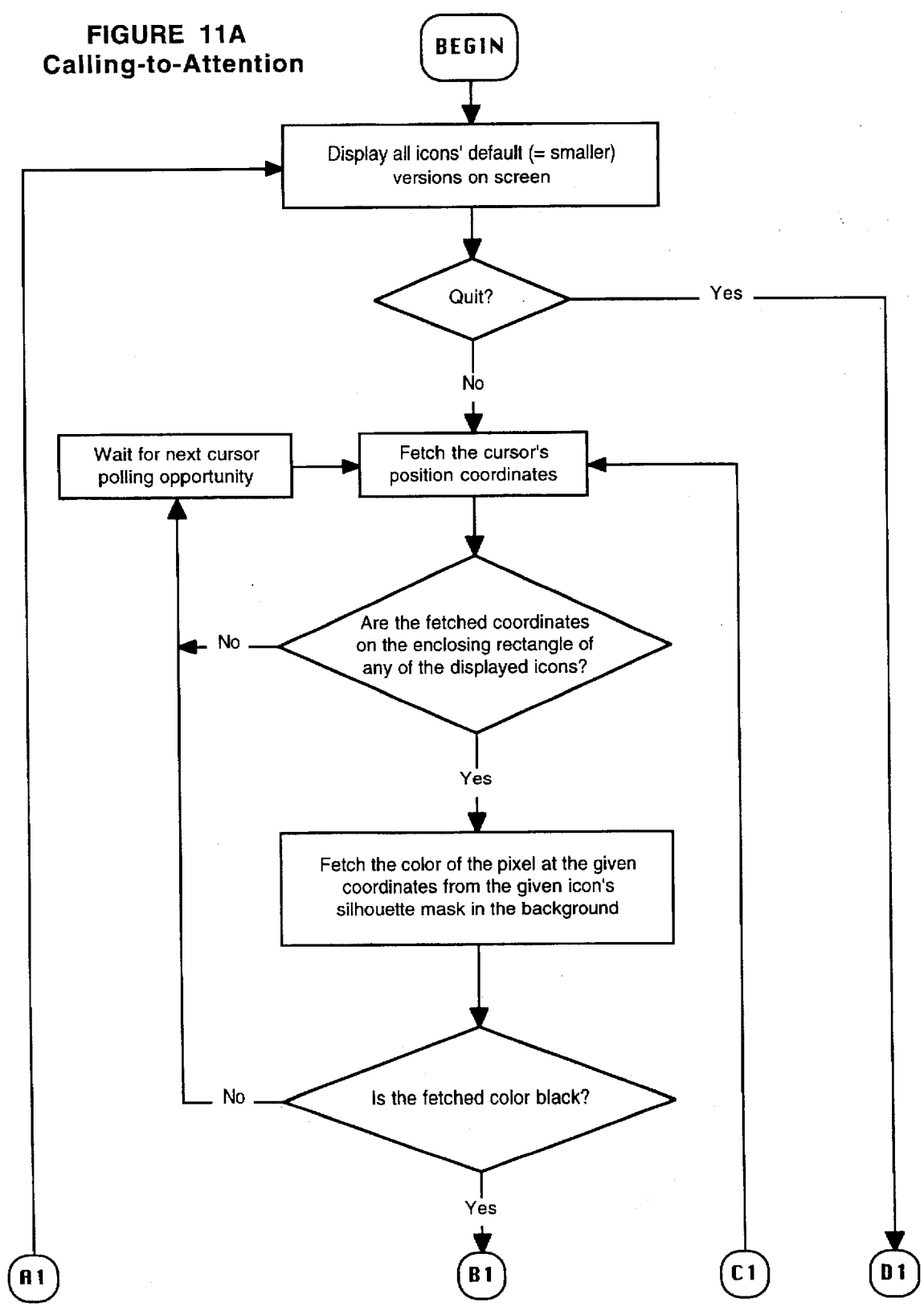

Calling-to-Attention
(cont.)

Auto-Projection

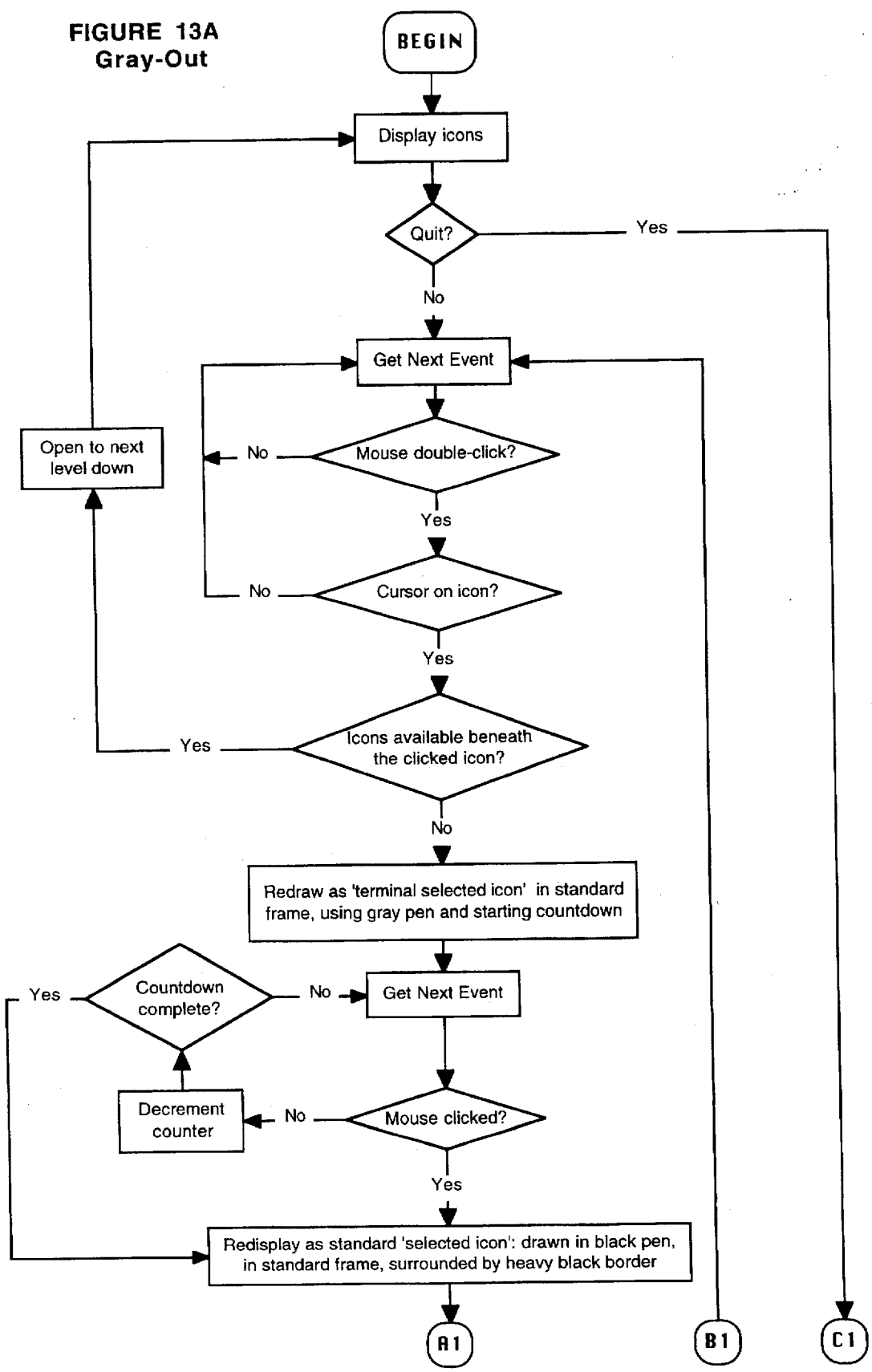

Gray-Out
(cont.)

Variable-Speed

Variable-Speed
(cont.)

Elevator

Elevator
(cont.)

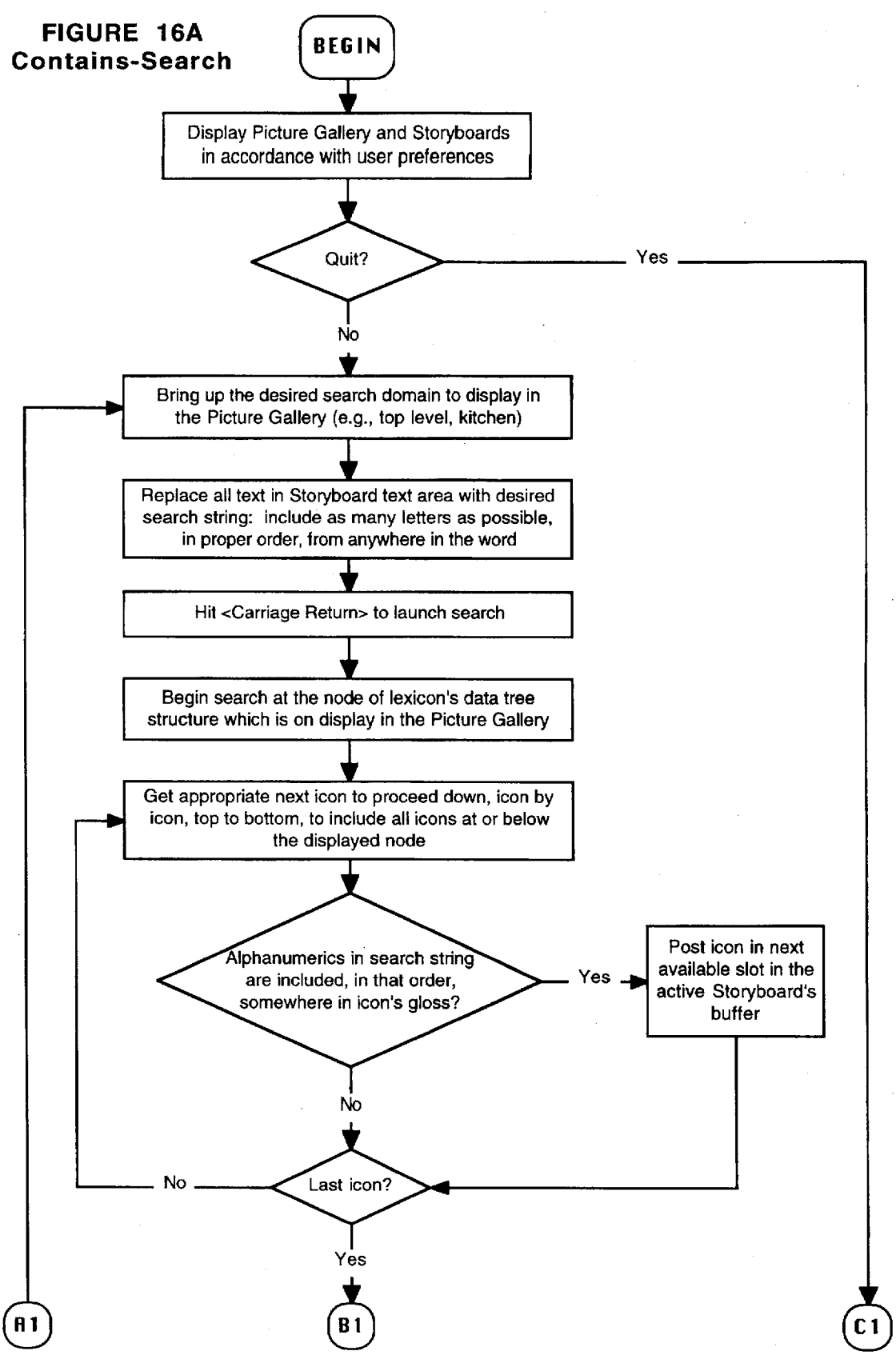

Contains-Search
(cont.)

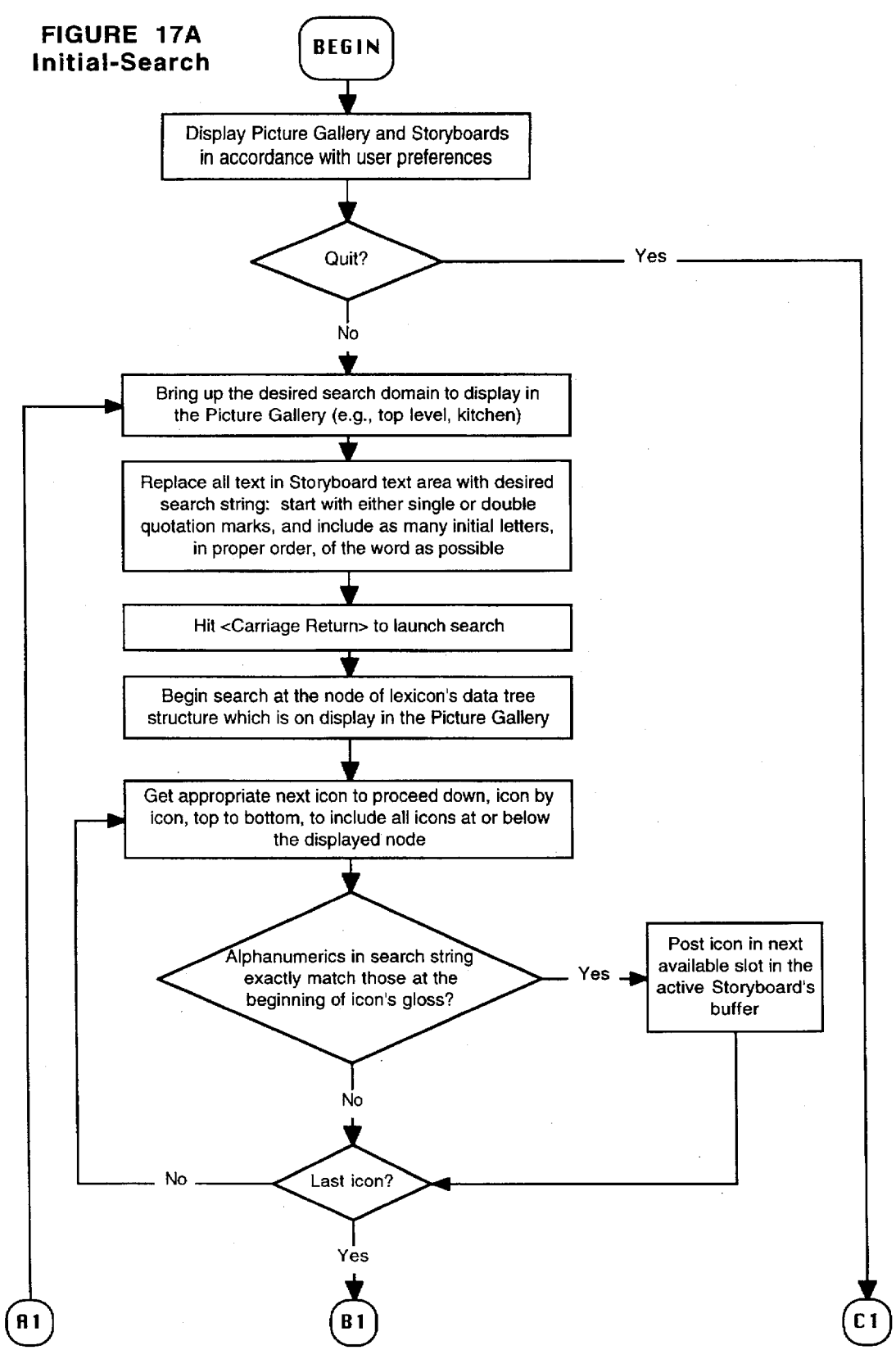

Initial-Search
(cont.)

Exact-Search

Exact-Search
(cont.)

METHOD OF COMMUNICATION USING SIZED ICONS, TEXT, AND AUDIO

This is a continuation of application Ser. No. 08/458,851 filed on Jun. 2, 1995 (now abandoned), which is a continuation of application Ser. No. 07/791,938 filed on Nov. 14, 1991 (now abandoned).

This application is submitted with a microfiche Appendix (Exhibit A), consisting of three (3) microfiches and two hundred forty-seven (247) frames, the copyright of which is retained by the owner. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to a method of facilitating communication involving a language-deficient user, and, more particularly, an aphasic user. However, as will be shown, hereinafter, the present invention can also be used to facilitate communication with: 1) a normal user who is conversant in a different language; 2) a normal person who is in the process of acquiring language(s); and 3) a person with communication difficulties deriving from speech impairments.

BACKGROUND OF THE INVENTION

Aphasic patients are patients who have lost the ability to understand and produce language due to brain damage. Aphasia can be produced, for example, by stroke. In chronic severely aphasic patients, the patient is permanently unable to read, write, speak or understand language-based communications. In addition, such aphasic patients are unable to learn to use keyboards or other language-based communication techniques, such as finger-spelling, sign language, or Morse code, to communicate. Thus, existing methods to communicate with such aphasic patients have proven to be profoundly limited.

In the prior art, it was recognized that severely aphasic patients could utilize a computer generating an icon-based language-oriented alternative communication system. These prior art methods have relied upon the basic principle of flash cards, utilizing the power of a microcomputer to implement them and then to begin to extend them to take initial advantage of the new medium of the computer. Thus, see for example, "Computer-Based Visual Communication in Aphasia" by Richard D. Steele, Michael Weinrich, Robert T. Wertz, Maria K. Kleczewska, and Gloria S. Carson, in *Neuropsychologia*, Vol. 27, pages 409–426 (1989). In that article, a C-VIC system for Computer-aided Visual Communication was reported. See also "A Method of Communicating with a Language Deficient Patient", by Richard D. Steele, Michael Weinrich, Young Harvill, and Maria K. Kleczewska, application Ser. No. 07/530,735, filed 30 May, 1990.

Other prior art includes: "Recipe Preparation by a Severely Impaired Aphasic Using the C-VIC 2.0 Interface", by Richard D. Steele, Michael Weinrich, and Gloria S. Carlson, in *RESNA '89: Proceedings of the 12th Annual Conference of the Association for the Advancement of Rehabilitation and Assistive Technologies*, Resna Press, pages 218–219 (1989); "Evaluating Performance of Severely Aphasic Patients on a Computer-Aided Visual Communication System", by Richard D. Steele, Gloria S. Carlson, Michael Weinrich, Maria K. Kleczewska, and Robert T. Wertz, in *Clinical Aphasiology*, BRK Publishers, Minneapolis, Minn., pages 46–54 (1987); "Processing of Visual Syntax in a Globally Aphasic Patient" by Michael Weinrich, Richard D. Steele, Gloria S. Carlson, Maria K. Kleczewska, Robert T. Wertz and Errol Baker, in *Brain and Language*, Vol. 36, pages 391–405 (1989); "Representations of 'Verbs' in a Computerized Visual Communication System" by Michael Weinrich, Richard D. Steele, Maria K. Kleczewska, Gloria S. Carlson, Errol Baker and Robert T. Wertz, in *Aphasiology*, Vol. 3, pages 501–512 (1989).

SUMMARY OF THE INVENTION

In the present invention a method of graphically communicating language-oriented information to and from a user by the use of a computer with a dynamic graphics display, having a pointing device for visually indicating a position through a cursor means on the display, is disclosed. Although a number of specific methods are disclosed, together they comprise an icon-based language-oriented system with the ability to manipulate and operate an icon-based language-oriented system.

BRIEF DESCRIPTION OF THE DRAWINGS

FIG. 1–10 are printouts of the screen display of the program of the present invention executing a particular function.

DETAILED DESCRIPTION OF THE INVENTION

Figure 2D:
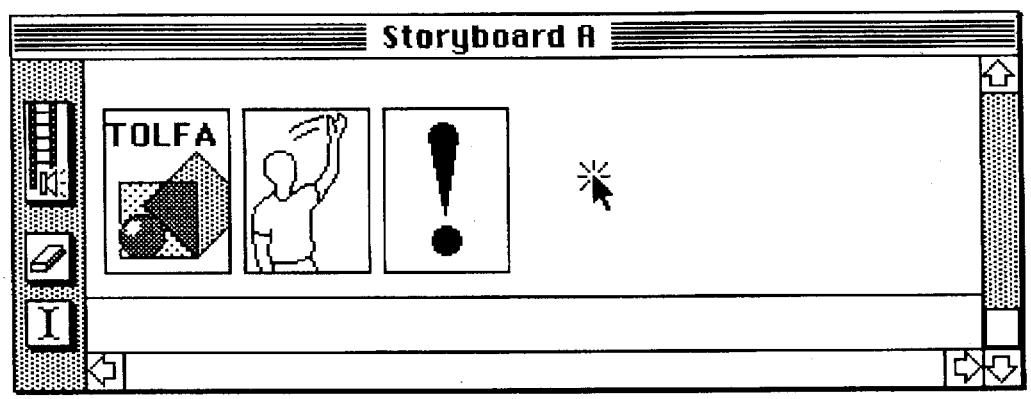

The present invention relates to a method of using graphic-linguistic means to communicate language-oriented information to and from a user. Some of the embodiments of the method described hereinafter have particular application to aphasic or language deficient users. Thus, as used herein, the term "aphasic" includes all language deficient or written and spoken communication disadvantaged users. In the preferred embodiment, the method of the present invention is practiced by using an Apple Corporation Macintosh Portable computer executing a program, a copy of the source code listing of which is attached herewith as Exhibit A. The icons generated thereby are all displayed via calls to the Apple Tool Box. The program attached in Exhibit A was created in the Forth language.

As used herein, the term "language-oriented" means supporting operations by a user who is not assumed to have fully functional language capability. It is concretely embodied in graphic representations of word-concepts as a primary modality for supporting communication, and which may be accompanied at the user's option by supplementary information in various modalities that supports the graphic communication of the concepts.

Aphasic patients whose language deficits preclude their operating general-purpose computer applications, such as word processors or spreadsheets, receive a system comprising a computer with the language-oriented graphic communication program already running, and without the ability to exit from the program; in this configuration, the system serves as a dedicated communication device. Non-disabled users receive an alternative configuration, in which the language-oriented graphic communication program resides as an application, alongside other applications, as options for launching and running from the highest level of the computer's operating system. In this configuration, users may launch and use the language-oriented communication system whenever they wish, and alternatively they may exit and use other applications (such as word processors) whenever they wish. The application may not be transferred to, loaded onto, and run on computers other the platform on which it is delivered. If a user attempts to launch such a transferred application on another computer, the program displays a dialog box explaining that the application runs only on the machine on which it was delivered, and providing a telephone number for getting answers to any related questions.

When the program is launched, it displays between two and four windows on the screen, depending on screen configuration options selectable by the user. In its full-display configuration, four windows appear: a Picture Gallery (located in the upper half of the screen), two Storyboards (Storyboard A and Storyboard B) overlapping beneath the Picture Gallery, and a tall, narrow Elevator column running vertically along the left-hand side of the screen. The three window types are all illustrated in the Figures which accompany this application. The user may exercise two independent display options, by setting two software switches, thereby altering this display: the user may choose between displaying and not displaying the Picture Gallery, and the user may also choose between displaying and not displaying Storyboard B. If the user chooses not to display the Picture Gallery, then the screen displays an unobstructed view of the Storyboard(s), showing Storyboard B above Storyboard A if both are displayed, or else showing just Storyboard A centered on the screen. If the user chooses not to display Storyboard B, then Storyboard A is centered horizontally and vertically in the screen if the Picture Gallery is not being displayed, or else Storyboard A is shown centered horizontally beneath the Picture Gallery if the latter is being displayed.

The Picture Gallery serves as the "lexical access" area in which icons are found and retrieved for use in communications, and the Storyboards serve as the "communication construction" areas in which icons are arranged to facilitate communication. The process of building a communication is one of interactively accessing, one after the other, the desired icons from the Picture Gallery and dragging them, once they are accessed, into desired positions in the Storyboards. The cursor tool, controlled by a pointing device that includes a single switch, is used to effect all such operations. Two pointing devices are provided with the computer: 1) a trackball-and-switch located immediately adjacent to the keyboard; and 2) a mouse which plugs into the Apple Desktop Bus (ADB) port in the rear of the computer. Any ADB-compatible mouse emulator can replace the mouse itself and can be used as the pointing device for operating the program; several such plug-compatible devices are commercially available at present for the system.

By design, exercising control via the pointing device involves a simple, limited repertoire of just four interactions, referred to as "pointing", "clicking", "double-clicking", and "dragging" in this environment. "Pointing" means to operate the control device in order to position the cursor at a desired location on the computer's display screen. To illustrate, as a mouse is moved over a flat surface, the cursor moves in like fashion on the screen; to "point" to a particular desired icon, the user moves the mouse over the flat surface in the appropriate direction until the cursor moves onto the area of the desired icon. "Clicking" means activating the switch (e.g., depressing and then releasing), once, on the pointing device. "Double-clicking" means "clicking" twice in cadent succession. "Dragging" involves purposefully activating (holding down) the mouse switch at one chosen location on the screen, and subsequently deactivating (releasing) the switch at another chosen location; in our system it is most frequently used to change position, purposefully, of a chosen graphic icon. All communications material in the system, graphic and linguistic both, can be accessed using this simple control repertoire. In particular, the system does not require the use of the keyboard to access or use any material (although it supports various such interactions for linguistically more intact users). As the user interacts with the pointing device to review, access, manipulate, display, and dispose of available graphic materials, the system has been constructed to provide the user with useful feedback via the graphic display.

FIG. 1 illustrates one such technique, in which usable icons are responsive to the presence of the cursor on them. Specifically, a usable icon responds by becoming slightly enlarged whenever the cursor lights upon it, and maintains its slightly enlarged size until the cursor moves off of its area. Not all graphic material on the screen is a usable icon, however. Any single screen may display two different types of graphic items, the first of which are available for active manipulation and employment by the user, but the second of which are unavailable for such active manipulation and use. These latter typically comprise background elements, whose purpose is to set the scene to aid in the interpretation of the usable icons. In FIG. 1, the gray "calendar month" framework in the background is just such an inert scene element: its purpose is to parse the month into weeks, to help the user determine approximate dates of various holidays and other special occasions within that month. Knowing an approximate date of an occasion may help the user correctly to infer which holiday is intended, by providing additional temporal information in support of a conceptual graphic depiction. For example, the presence of an icon showing a donkey and an elephant might be difficult to interpret in isolation; however, knowing that this date falls towards the beginning of the month of November can be helpful in correctly inferring that the designer's intent was to provide an icon for "Election Day". It is useful to be able, dynamically, to distinguish, however, between graphic material of the first sort (the icons) and graphic material of the second sort (the background).

We do this by having the usable icons—that first sort of material—visually "respond" whenever the cursor lights on them (or is positioned on them), while background elements remain inert whether the cursor lights on them or not. This can be a change in size, shape or color. In addition, the icon can respond audibly. The specific visual response of the usable icons is to expand slightly in all directions from their center, while maintaining their shapes unaltered. FIG. 1 provides some specific examples: we see three icons in FIG. 1 arrayed against the background of a month divided into weeks. In this example, the month is November, and the icons represent Election Day (donkey and elephant), Veterans Day (Unknown Soldier Tomb), and Thanksgiving (Pilgrims and turkey). The month framework is drawn in gray, further to emphasize its inertness, while the three icons are drawn in black. The icons in this Figure have been repositioned to facilitate the comparison of their respective sizes under different conditions, against the background of the calendar grid.

When the cursor is not atop any of the three icons, then all the icons within this domain are of identical size; we illustrate this condition in Drawing #2 of FIG. 1. Here the cursor is below all three icons, and the edges of the icons line up exactly against the grid of the month. Drawing #2 of FIG.

1 also shows the cursor atop the gray outline of the month background, yet its presence on that background figure causes no change in that background figure's appearance: it remains inert at all times, regardless of the motions of the cursor about the screen.

The behavior of the three icons themselves, however, is different. Whenever the cursor lights or is positioned on one of these icons, as shown in Drawing #1 of FIG. 1 (where the cursor is shown on the Thanksgiving icon), the icon responds visually by expanding a small amount in each direction. Comparing the Thanksgiving icon carefully with its two neighbors in the upper and lower drawings of FIG. 1 reveals this incremental increase in area about its center. In Drawing #1 of FIG. 1, the Thanksgiving icon no longer lines up exactly with either its neighbor to the top or to the right, simultaneously extending further north, east, south, and west about its center than do the neighbors. (The relative directions are for illustration purpose only.) While the absolute increases in size are small (here ca. 6% in height and 8% in width, yielding ca. 15% increase in area) and may easily be overlooked when presented in abutting static drawings, as in FIG. 1, the dynamic change perceptually is quite striking, especially when the change occurs abruptly, as in our system. Perceptually, it is somewhat akin to the icon suddenly being called to attention and straightening up.

The icon maintains its larger dimensions as long as the cursor remains anywhere on the new larger enclosed area. The cursor may move about freely throughout the new larger area without causing any further change in the appearance of the icon. However, once the cursor crosses the boundary of the larger display and departs the area of the icon's slightly enlarged display, the icon immediately resumes its initial smaller dimensions and appearance, as is shown in Drawing #2 of FIG. 1. At this point, the user may reinitiate the entire set of interactions, from the beginning, if he so desires.

Further, in FIG. 1, we have illustrated using our standard size and frame icons, in default (smaller) rectangles with display areas of 48×64 pixels on the Macintosh display (with a 1 pixel border on each side, they measure 50×66 pixels). We deliberately selected icons with rectangular default shapes, since this simplifies the task of comparing dimensions between adjacent icons in FIG. 1. However, it should be emphasized that all icons, of any size and of any shape whatever, will exhibit the very same behaviors, becoming larger when the cursor lights on them and smaller when the cursor departs them. This is of particular importance where naturalistic scenes are presented, containing icons of significantly differing sizes and shapes. For example, in a scene of a room, the door might be a large icon, while its doorknob might be another, much smaller icon. These two will differ significantly in size and shape both. Nonetheless, they will both behave as described above: when the cursor falls upon either one, it will become displayed in its slightly enlarged version; and it will maintain that somewhat enlarged display until the cursor departs it for some other part of the scene. In such naturalistic settings, the behavior not only notifies the user that the cursor has successfully achieved the area of an icon, but simultaneously gives the user potentially valuable information about the size, shape, location, and probable identity of that particular icon. In unfamiliar naturalistic scenes, simply moving the cursor about can thus become an easy and effective way to explore just which are the icons, how they relate to one another, and what their probable meanings are.

Figure 11B:
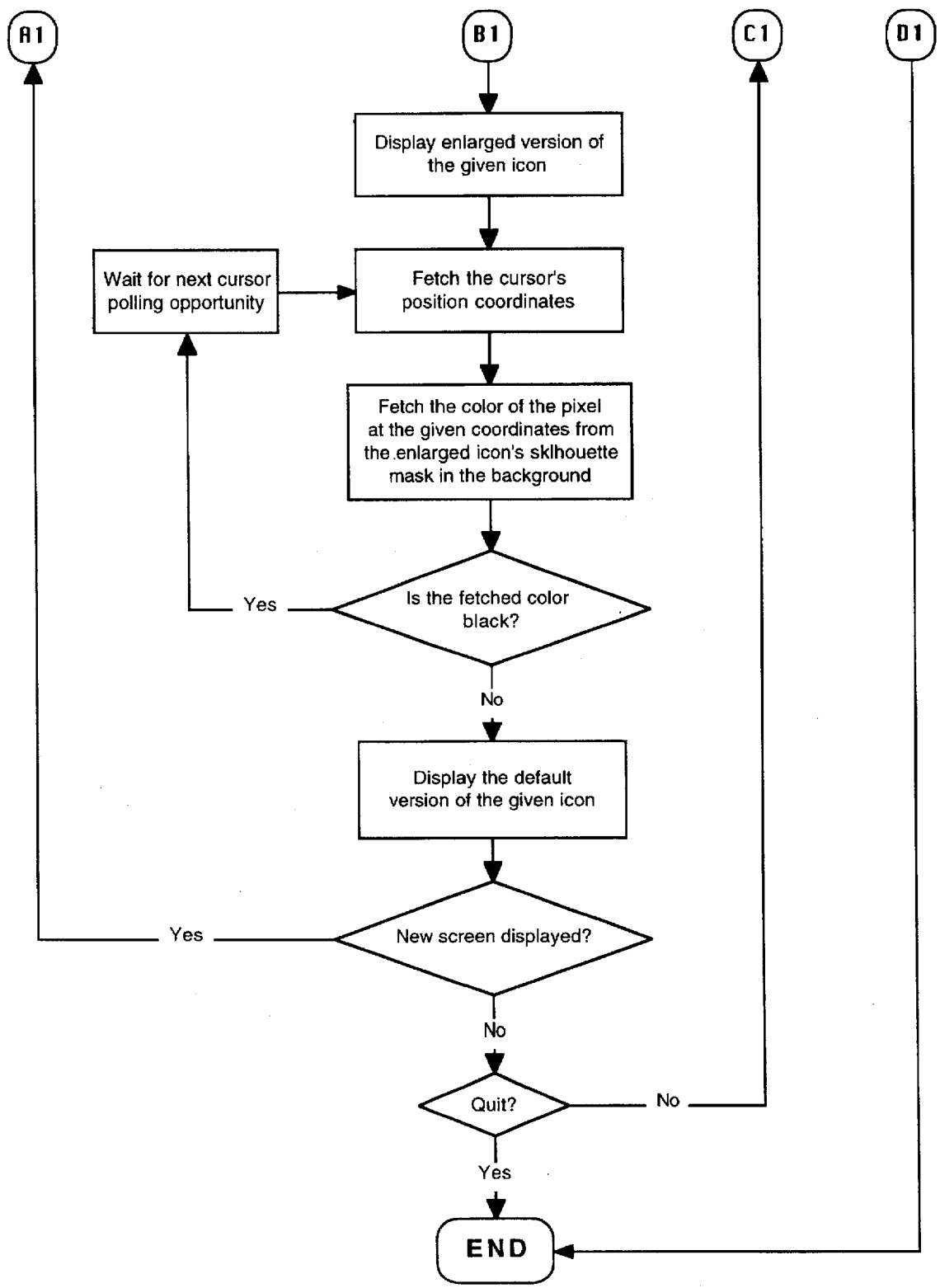
FIG. 11–18 are flow charts showing the method of the present invention.

FIG. 11 is a flow chart showing the implementation of the method described and shown in FIG. 1.

Figure 4D:
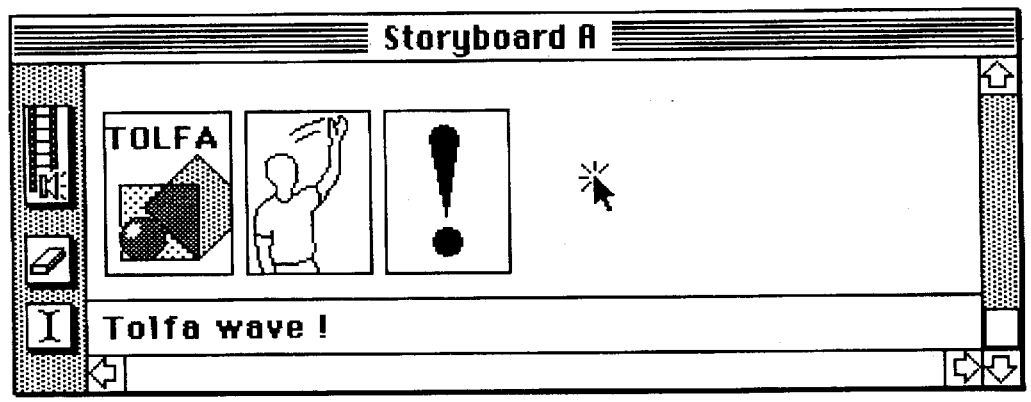

FIGS. 2, 3, and 4 illustrate how users may interrogate an icon for additional information. This interrogation process is always initiated by the user clicking once while holding the cursor over an icon. By virtue of the cursor's position on an icon, that icon will be displayed in its slightly enlarged version (see FIG. 1), and this is reflected in the drawings of FIGS. 2, 3, and 4, without further elaboration of the point. There are three related responses to such single clicks on an icon, and these are elaborated in FIGS. 2, 3, and 4 respectively and discussed in sequence below.

FIG. 2 illustrates the system's response to a single click upon a static icon displayed in a standard size and shape frame (in contradistinction to FIG. 3, with icons of differing sizes and shapes), and with no associated animation (in contradistinction to FIG. 4, in which animations are displayed). In this instance, the following sequence of events occurs once the user single-clicks an icon. First, the icon is surrounded by a heavy black border. At this point, visual feedback of the click, in the form of a brief starburst about the tip of the cursor arrow, appears; additionally, if the user has exercised the option of displaying mouse switch feedback in audio Click as well, and has set the system volume to some positive integer, then a brief audio 'click' sounds concurrently with the starburst that appears about the tip of the cursor arrow. Drawing #1 of FIG. 2 shows the starburst feedback at the tip of the cursor arrow, indicating that the user is clicking on the last icon, the 'exclamation point [!]'.

Once the visual feedback of the click is complete, the cursor disappears, and the entire icon—the frame along with its enclosed image—is enlarged by doubling dimensions in each direction (yielding a fourfold increase in area). This stage is illustrated in Drawing #2 of FIG. 2. This enlarged image is displayed in a position that is centered over the smaller icon, as long as this is possible without obscuring any of the enlarged image. If any of the enlarged image would be obscured by the boundaries of the window if so displayed, then the enlarged image is shifted the minimal distance(s) to appear with completely unobstructed visibility, as close to the position centered over the smaller icon as possible. If text is being displayed (a user-selectable option), then when an icon enlarges in the Picture Gallery, that text enlarges as well and is displayed centered beneath the enlarged display; in a Storyboard, the text associated with an icon changes its polarity at this point in the text area, to appear as white on black. If speech output is ON (a user-selectable option), then just before the enlarged display any gloss-words associated with the icon are spoken aloud (punctuation marks, such as the exclamation point, are never spoken).

This enlarged icon display remains on the screen for approximately three seconds, unless it is terminated by the user, who can force truncation of the enlarged icon display at any time during those three seconds by an interrupting single click. Regardless of how the enlarged icon display is terminated—by running out the clock, or by being interrupted by the user—it is ultimately replaced by the original smaller image, in the standard size and shape frame, but surrounded by a heavy black frame all around, with the cursor once again displayed. This stage is illustrated in Drawing #3 of FIG. 2. The heavy black frame serves to identify this particular icon as the most recent object of interrogation. The heavy black border remains around the icon until the user clicks elsewhere on the screen, signaling a shift in the locus of attention. At this point, the heavy black border disappears from around the icon, any text in reverse video changes polarity back to the default black on white, and everything appears in its default display, ready again to enter into these transactions from the very beginning, should the user so desire. This final stage in the transactions is illustrated in Drawing #4 of FIG. 2.

FIG. 3 shows what happens when an icon of non-standard frame size and shape is single-clicked. Such icons occur frequently within naturalistic or schematic scenes of various sorts, and may vary considerably in size and shape. In FIG. 3, we show various rooms of a house taken from the schematic floor plan of that house, and we illustrate by clicking on the closet near the entryway. Casual observation might suggest that these various rooms of the floorplan are represented by rectangles, but in fact they are not. The living room and the bedroom, for example, are both in the shape of a large capital 'L'; in the other rooms, the doorway, indicated by a gray indentation representing the threshold, interrupts the rectangularity of the object. In these latter cases, the deviation from rectangularity is slight (since houses are mostly rectilinear), but the principle is significant: in scenes such as these, default icons may be of whatever sizes and shapes are required by the domain being portrayed. In such instances, the following sequence occurs when such an icon is single-clicked.

First, the user positions the cursor on one of the icons and clicks. This is shown schematically in Drawing #1 of FIG. 3. Upon clicking, the cursor disappears, the original irregular icon shape is redrawn in gray over a white mask, and a complementary view of the icon, displayed in a standard size and shape frame, is superimposed over the original icon. This standard size and shape icon will be positioned to be centered over the original icon, as long as this is possible without obscuring any of the standard size and shape icon. If any of that standard configuration icon would be obscured by the boundaries of the window if so displayed, then the standard configuration icon is shifted the minimal distance (s) to appear with completely unobstructed visibility, as close to the position centered over the original icon as possible.

If text is being displayed (a user-selectable option), then the icon's associated gloss appears centered beneath the standard size and shape frame, as shown in Drawing #2 of FIG. 3. If the speech output is ON (another user-selectable option), then the gloss associated with the icon is spoken aloud when the standard size and shape frame appears: in Drawing #2 of FIG. 3, a voice would say "closet" as the word itself appears on the screen.

The view presented in the standard size and shape icon will be closely related to the default irregular-shaped view of the icon, but it will characteristically differ in various respects as well. Comparison of the views of the "closet" in Drawings #1 and #2 of FIG. 3 illustrates this relationship. Differences may affect the arrangement or framing of graphic elements, as well as the addition or subtraction of graphic elements. The changes are motivated by several factors. The relative size of the two views may dictate changes; the orientation may occasion changes as well. In this instance, the orientation of the standard-frame view allows for a more natural display of items in a "closet", as well as allowing for the inclusion of additional items to provide more help to users. Bearing in mind that it is the standard-frame view which will appear in Storyboard contexts, where the "floorplan" schema will not be present, we can appreciate that additional graphic information to help users recall or decipher the icons may well be appreciated.

Next, the entire standard configuration icon—the frame along with its enclosed image—is enlarged by doubling dimensions in each direction (yielding a fourfold increase in area), and is displayed atop a slightly larger white mask. This enlarged image is displayed in a position that is centered over the smaller standard icon, as long as this is possible without obscuring any of the enlarged image. If any of the enlarged image would be obscured by the boundaries of the window if so displayed, then the enlarged image is shifted the minimal distance(s) to appear with completely unobstructed visibility, as close to the position centered over the smaller icon as possible. If text is being displayed (a user-selectable option), then the text enlarges in size as well, and is displayed centered beneath the enlarged view of the icon.

This enlarged icon display remains on the screen for approximately three seconds, unless it is terminated by the user, who can force truncation of the enlarged icon display at any time during those three seconds by an interrupting single click. Regardless of how the enlarged icon display is terminated—by running out the clock, or by being interrupted by the user—it is ultimately replaced by the smaller icon configuration, in the standard size and shape frame of Drawing #2 of FIG. 3, surrounded by a heavy black frame all around, with the cursor once again displayed. This stage is illustrated in Drawing #4 of FIG. 3. The heavy black frame serves to identify this particular icon as the most recent object of interrogation. The heavy black border remains around the icon until the user clicks elsewhere on the screen, signaling a shift in the locus of attention. At this point, the heavy black border disappears from around the icon, and everything appears in its default display, ready again to enter into these transactions from the very beginning, should the user so desire. This final stage in the transactions is illustrated in Drawing #5 of FIG. 3.

FIG. 4 shows what happens when an icon with an associated animation is single-clicked by the user. Currently, such icons are typically associated with lexical items having either verb-like or preposition-like meanings, and the animations help communicate the essential verb-like or preposition-like senses. In their default views, these icons all currently appear in the standard size and shape icon frame—a single-pixel border surrounding a 48×64 pixel display area.

First, the user positions the cursor on one of the icons and single-clicks. This is shown in Drawing #1 of FIG. 4. Subsequently, the icon is surrounded by a heavy black border. At this point, visual feedback of the click, in the form of a brief starburst about the tip of the cursor arrow, appears; additionally, if the user has exercised the option of displaying mouse switch feedback in audio Click as well, and has set the system volume to some positive integer, then a brief audio 'click' sounds concurrently with the starburst that appears about the tip of the cursor arrow.

Once the visual feedback of the click is complete, the cursor disappears, and the entire icon—the frame along with its enclosed image—is enlarged by doubling dimensions in each direction (yielding a fourfold increase in area). This stage is illustrated in Drawing #2 of FIG. 4. This enlarged image is displayed in a position that is centered over the smaller icon, as long as this is possible without obscuring any of the enlarged image. If any of the enlarged image would be obscured by the boundaries of the window if so displayed, then the enlarged image is shifted the minimal distance(s) to appear with completely unobstructed visibility, as close to the position centered over the smaller icon as possible. If text is being displayed (a user-selectable option), then when an icon enlarges in the Picture Gallery, that text enlarges as well and is displayed centered beneath the enlarged display; in a Storyboard, the text associated with an icon changes its polarity at this point in the text area, to appear as white on black. If speech output is ON (a user-selectable option), then just before the enlarged display any gloss-words associated with the icon are spoken aloud.

In FIG. 4, the word "wave" would be spoken aloud just before the enlargement and animation begin.

When the enlarged icon appears, the animation begins. The animation consists of up to twenty frames which are displayed in rapid succession. If allowed to run without interruption, the animation lasts for approximately three seconds. Thus, the enlarged icon display remains on the screen for approximately three seconds, unless it is terminated by the user, who can force truncation of the enlarged animated icon display at any time during those three seconds by an interrupting single click. Regardless of how the enlarged animated icon display is terminated—by running out the clock, or by being interrupted by the user—it is ultimately replaced by the original smaller image, in the standard size and shape frame, but surrounded by a heavy black frame all around, with the cursor once again displayed. This stage is illustrated in Drawing #3 of FIG. 4. The heavy black frame serves to identify this particular icon as the most recent object of interrogation. The heavy black border remains around the icon until the user clicks elsewhere on the screen, signalling a shift in the focus of attention. At this point, the heavy black border disappears from around the icon, any text in reverse video changes polarity back to the default black on white, and everything appears in its default display, ready again to enter into these transactions from the very beginning, should the user so desire. This final stage in the transactions is illustrated in Drawing #4 of FIG. 4.

FIGS. 2, 3, and 4 are close relatives of one another, and it may help to characterize explicitly that which ties them together, and why they are related thusly. In this context, it is useful to think of their behaviors in terms of the purposes and expectations of the user. By design, the icon is programmed to play its role in a formally regulated set of mutual and complementary purposeful interactions between the user and the icons. The initiator of the interactions is always the user, and the responses are designed to conform to his intentions and needs. The user communicates his intentions by positioning the cursor arrow and clicking. For example, when he arrives at a new collection of icons, the user may need to scrutinize them for a time. During this phase, individual icons remain static, since uncoordinated, spatially distributed animations can distract attention or disrupt concentration. At the point where the user has focused on a single icon for closer scrutiny, he clicks on it. The icon 'responds', first, by transmuting itself formally into a standardized format (the 48×64 pixel display area format), then enlarging itself for a time, during which it presents enhanced information about itself (always enlarged, sometimes animated), then adopting an "at your service" stance, in a heavy border and ready for use but otherwise inactive. The enlargement phase both confirms for the user that the desired icon has been selected, and additionally provides additional information. This response accords with the purposes of the user. He has specified it through clicking as being the item of interest, he is offered the choice of further corroborating his selection, or else truncating it forthwith with an interrupting click. Following the enlarged display, the icon returns to the smaller size, but retains a heavier black surrounding border as a sign that it is the most recent object of attention, and displays the face which it will present if used in a Storyboard. When the user clicks elsewhere on the display screen, he communicates thereby that his attentions are now directed elsewhere; accordingly, the heavy black border disappears from the previously clicked icon, and the view returns once again to the original, default icon view. Regardless of extreme variability in their default appearances, icons are united in behaviors, and this confers upon them a unity of identity which is belied by the variability in their default appearances. The icons communicate as much by their behaviors as they do by their appearances, but only the latter appear directly when using ink on paper, as here.

Figure 12:
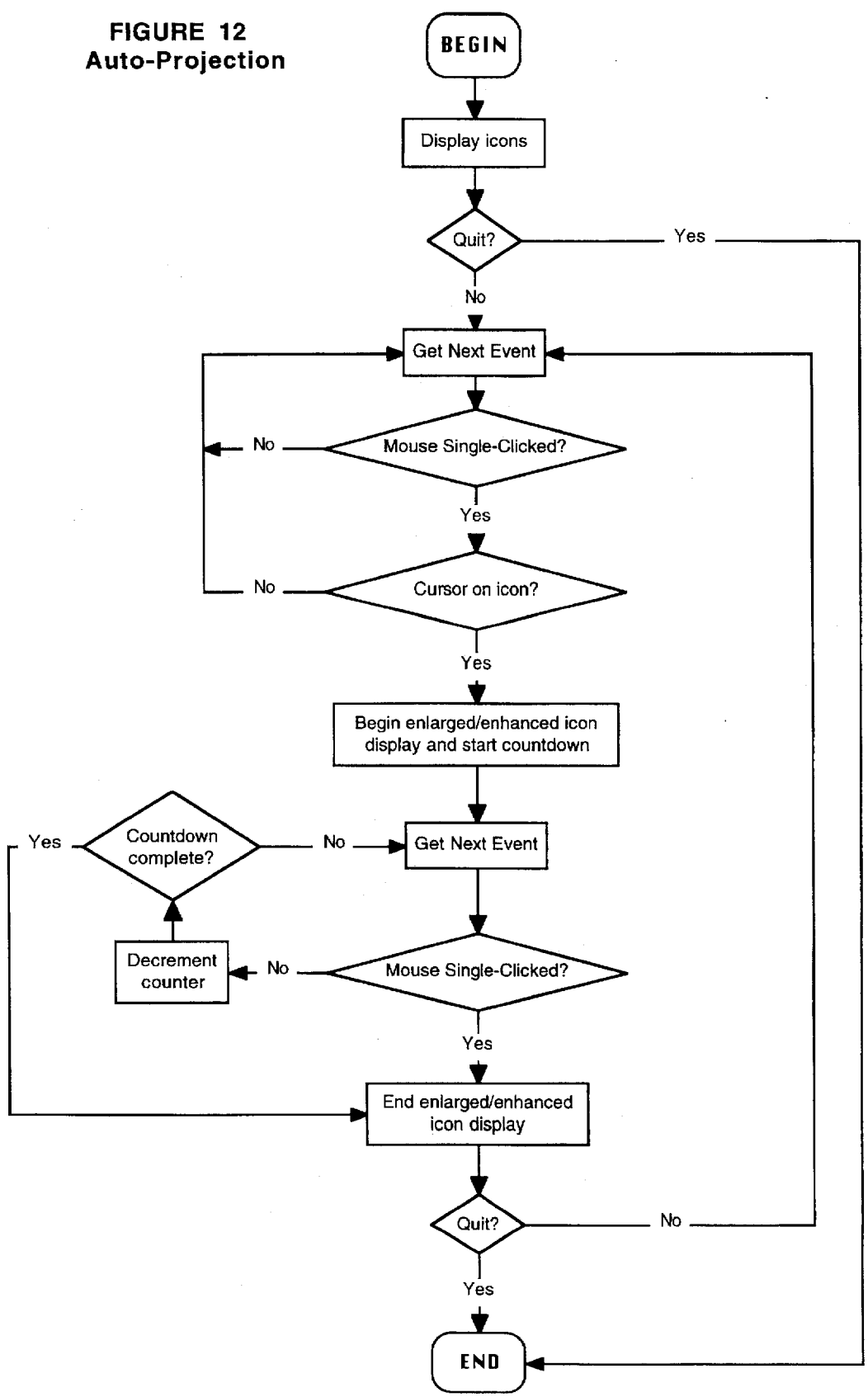

FIG. 12 is a flow chart showing the method of FIGS. 2, 3, and 4.

Figure 5D:
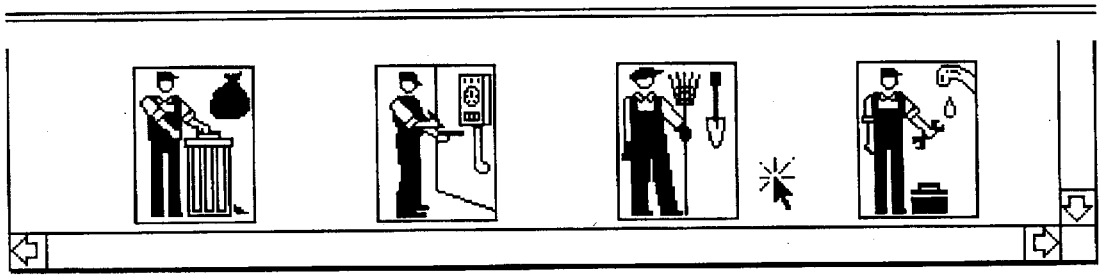

FIG. 5 illustrates a different type of manipulative-graphic interaction with icons that provides useful information to a user. To understand this example, one must know that the way in which one graphically navigates down the data base tree of the Picture Gallery, in order to access more and more specific icons, is by double-clicking on icons. Data in a tree structure is arranged in a hierarchy with a plurality of layers. If a given icon in a current layer contains subcategory icons beneath it in the data base tree, then it will open up onto the subcategory when it is double-clicked. To give an actual example, if we were to doubleclick on the "closet" icon from the floor plan depicted earlier in FIG. 3, we would in fact open up onto a view of the entryway closet, with its contents of a heavy outdoor coat, a muffler, an umbrella, galoshes, and mittens, among other things.

When an icon contains no icon in a layer beneath the current layer, however, we use the method shown in FIG. 5 to communicate graphically the unopenability of the icon to the user. When the user double-clicks on a terminal-node icon, as in Drawing #1 of FIG. 5, expecting it to open, the program first displays the standard size and frame icon view of the item, such as is displayed after an icon has been selected and its enlarged display has run its course. The program immediately surrounds this standard-format icon by a heavy black frame. Then, instead of opening onto another level, the image in the 48×64 pixel display area is redrawn in gray, as shown in Drawing #2 of FIG. 5. The grayed-out version of the graphic image is displayed for approximately 1 second, unless truncated by an interrupting single click by the user. Upon truncation or running its course, the gray image is replaced by the original image drawn in black, as shown in Drawing #3 of FIG. 5. The icon is still surrounded by the heavy black border, indicating that it is the most recent item of manipulation by the user. When the user clicks elsewhere on the screen, as shown in Drawing #4 of FIG. 5, the heavy black border disappears, and the default view of the icon—whether in the standard format frame or as a nonstandard scene element—reasserts itself.

Figure 13B:
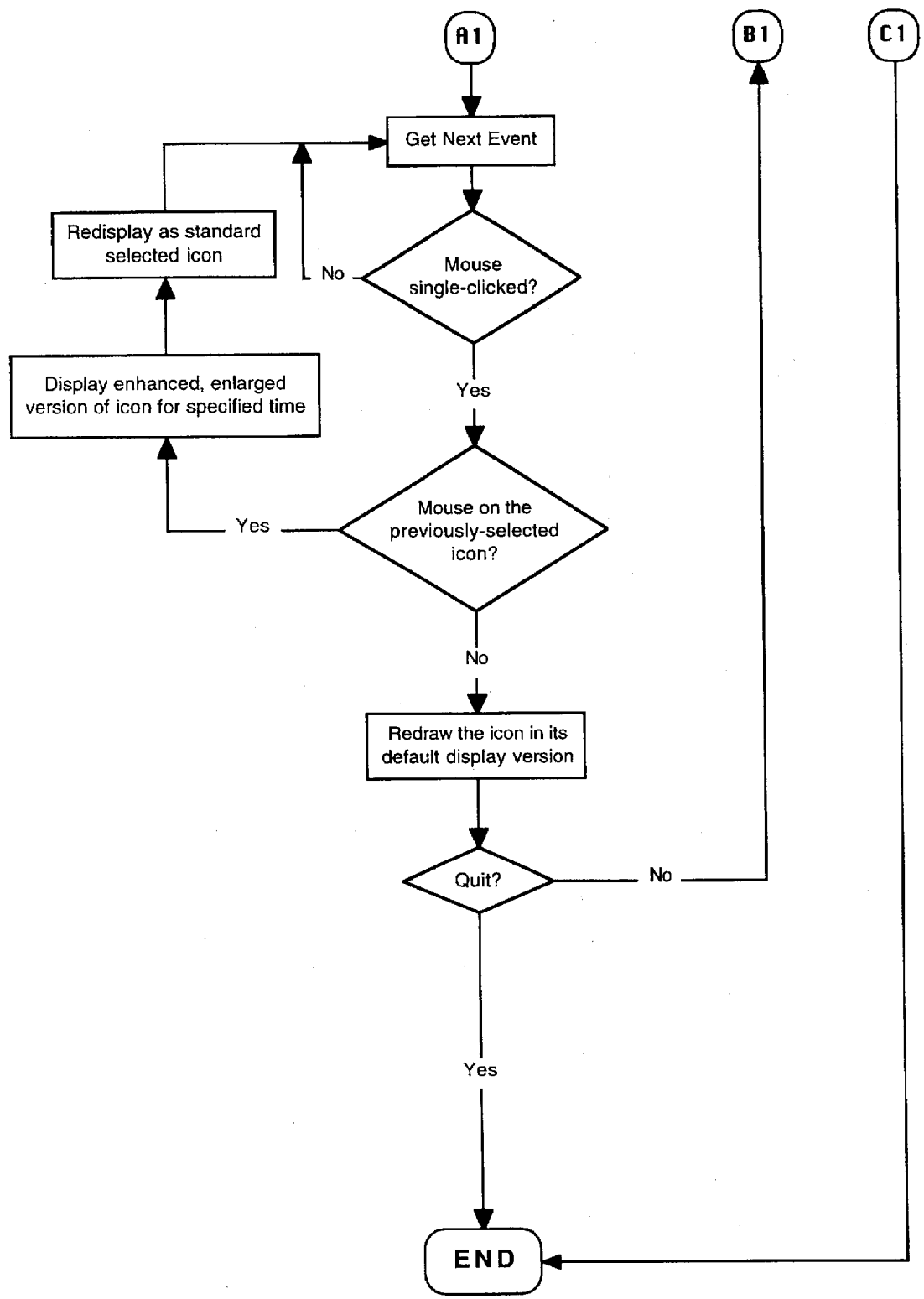

FIG. 13 is a flow chart showing the method of FIG. 5.

FIG. 6 illustrates a way in which sequences of icons and their linguistic glosses, when assembled in a Storyboard to support communication, may be displayed at varying tempos to take advantage of the relatively stronger modalities of the various different system users. It is important to recall here that communication inherently involves two (or more) individuals, and that—by observation—a very common scenario in the use of this system is that one of the persons is language-disadvantaged while the other person is not. Such, for example, is the situation within homes with a single adventitiously language-disadvantaged person, say a stroke survivor, where other family members are language competent. The two types of users will employ our system most effectively in different ways, owing to the differing implications of their distinct intact abilities. The language-disadvantaged user, for example, will not be able to rely on the speech output or text as the primary vehicle for conveying meaning; for this population the graphic images, with their deliberately designed appearances, behaviors, and interactions, will carry the burden of conveying meaning. If the language-encoded material (text, speech output) can be of assistance to them at all, it will be in a secondary role, as confirmation for inferences made on the basis of their inspecting the graphic-iconic material. This 'language-disadvantaged perspective' implies a certain stately rate of exposure to the graphic materials as—one by one—they enlarge, run through their various screenings, then yield the stage to their immediate-right neighbor, until the last icon has acted out its script. In order accurately and reliably to extract the intended meanings from each of the icon playbacks, the user may well need to view each such icon-screening fully. And since each such icon-screening occupies approximately three (3) seconds, the communication rate in such worst-case-rate scenarios will be approximately twenty (20) icon/word-concepts per minute (i.e., 60 sec per min./3 sec per icon-screening=20 icon-screenings per min.). In light of the considerations above, we must accommodate presenting the Storyboard icon-sequences at this rate.

Language-competent individuals, however, will perceive this rate as very slow. Normal conversational rates fall into the range of 120–200 words per minute, and it is clear that language unimpaired users will want to speed things up for their own purposes, whenever possible without disruption to the communicative process. Such a situation may obtain whenever a language-disadvantaged person has a pre-prepared communication ready for a language-competent person. In this situation, it may be unnecessary to re-display the communicative materials at the slower, 20 word/min rate, since the language-disadvantaged user who composed the communication may recall perfectly well what its message is. In this situation, both partners in the communicative transaction may choose to display the communicative materials at an accelerated display rate, in order more nearly to approximate the rates of normal conversational exchanges. This may not be simply a matter of convenience; in some cases it may be a necessity.

Specialists working with technology-based communication aids have studied the effects of speech-output generation rates on the behaviors of language-competent users. They have observed, among other things, a consistent pattern which is germane here: if the speech-output generation rate is at too great a variance with normal speech rates, then the attention and even engagement of the language-competent user may be lost. It appears that humans are innately attuned to processing speech materials aurally at the relatively rapid rates; indeed, people appear to require such tempos. If words are spoken at significantly slower rates, say 20 or fewer words per minute, then people consciously must engage essentially different strategies in order to effect comprehension, storing up the words consciously and holding them in memory until the communication is complete, at which time they can mentally play the entire sequence back fast enough to extract the meaning. In other words, the rapid tempo may be a requirement for attracting, holding, and utilizing the communicative attentions of many language-competent users.

In order to provide for a range of display speeds, then, which can help meet the differing needs of the slowest users, the fastest users, and those in between, we have a Playback Button at the left side of the Storyboards, as shown in Drawing #1 of FIG. 6. Generically, clicking on this Playback Button launches a procedure of playing back an entire icon sequence. This entails calling on each icon, from left to right and from first to last in uninterrupted sequence, to enlarge itself, to present its enlarged screening plus any associated language material which is (by user choice) being displayed, and then to return to its previous default display. It is rather as though an invisible user goes systematically down the row, single-clicking each icon to elicit the behaviors illustrated in FIGS. 2 through 4. If, by user choice, speech output is turned ON, then the gloss associated with each icon will be spoken aloud just before it enlarges.

By design, clicking at various heights on the Playback Button globally sets the rate of the playback process. Clicking at the top of the button (where the graphic of the filmstrip predominates) launches playback at the most leisurely rate, approximately 20 word-icons displayed per minute. In fact, what the program is doing in this instance is allowing each icon to display its enlarged screening fully and completely, then immediately evoking the enlarged screening of the subsequent icon. This is illustrated in Drawing #2 of FIG. 6, which shows the first of the icons in the sequence, containing the Tolfa name and logo, displayed in its enlarged screening. In addition, the word associated with each icon is also spoken completely. By contrast, clicking on the Playback Button at the bottom (where the graphic of the loud speaker predominates) results in the most rapid display possible. This is illustrated in Drawing #3 of FIG. 6. In this instance, the icons may not enlarge themselves at all, as the words are spoken as rapidly as the hardware can retrieve the digitized waveforms from disk and put them through the synthesizer chip and loudspeaker. Thus, the images of the icons are truncated. On the platform currently in use, a Macintosh Portable using a Motorola 68000 microprocessor with a clock speed of 16 MHz, accessing digitized speech from a 40 Mbyte internal hard drive, the fastest speech rate is approximately 60 speech-output words per minute, which puts it well within the range for holding the listener's attention and enabling him to understand the communicative intent via the speech. It should be borne in mind that the speech stretches themselves (the individual glosses) are not accelerated at all: the time they occupy is wholly determined by their sampling rate, number of samples, and synthesis rate. Rather, the accelerated rate of delivery is obtained solely at the expense of the icons' enlarged screenings: rather than allowing approximately three seconds for each of these, the procedure here is to allocate no time for them whatever.

When the user clicks on the Playback Button at a height intermediate between the top and the bottom of the button, then the global display rate for playback will be set, by extrapolation, to a rate intermediate between the slowest (20 wpm) and the fastest (60 wpm) rates, based on the relative distance of the click-point from the Playback Button's two ends. Thus, for example, if the user clicks in the very center of the Playback Button, the global display rate for playback will be set at 40 wpm, which is midway between the fastest and slowest rates. This allows the users to select a speed of playback from a continuous range, with endpoints of demonstrated usefulness. In the case where such an intermediate global speed of playback is selected, then the enlarged screening of each individual icon is truncated at the appropriate point to achieve the desired rate. In the example above, static icons, whose display is actively timed, will have their enlarged display times reduced from three seconds to one and a half seconds; animated icons that display 20 frames when allowed uninterrupted enlarged screenings will project just ten of those frames. Thus, the animations will be shorter not by virtue of being speeded up, but by virtue of being ended after only a portion of their images have been displayed at their regular animation speed.

Figure 14A:
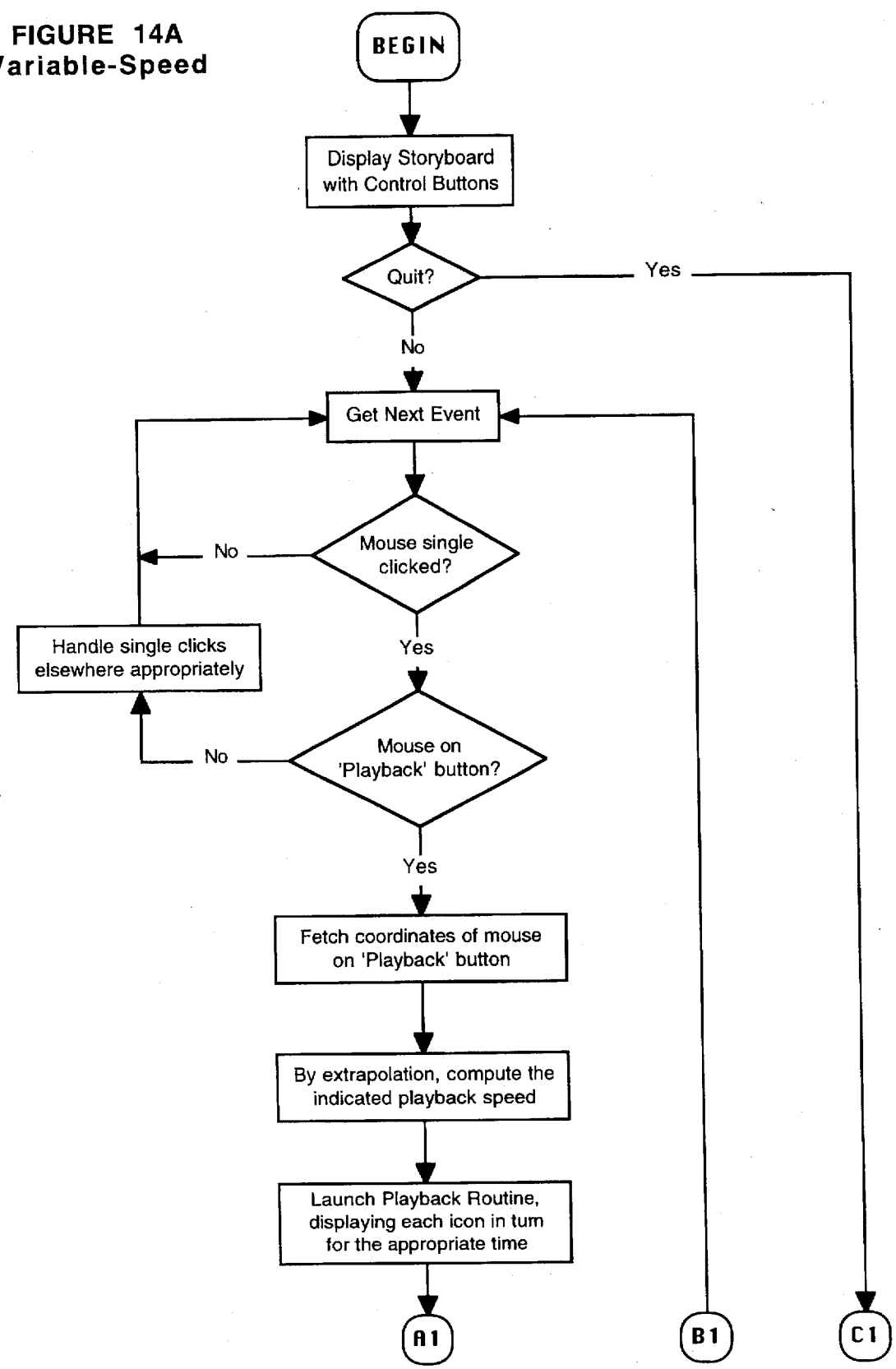
Figure 14B:
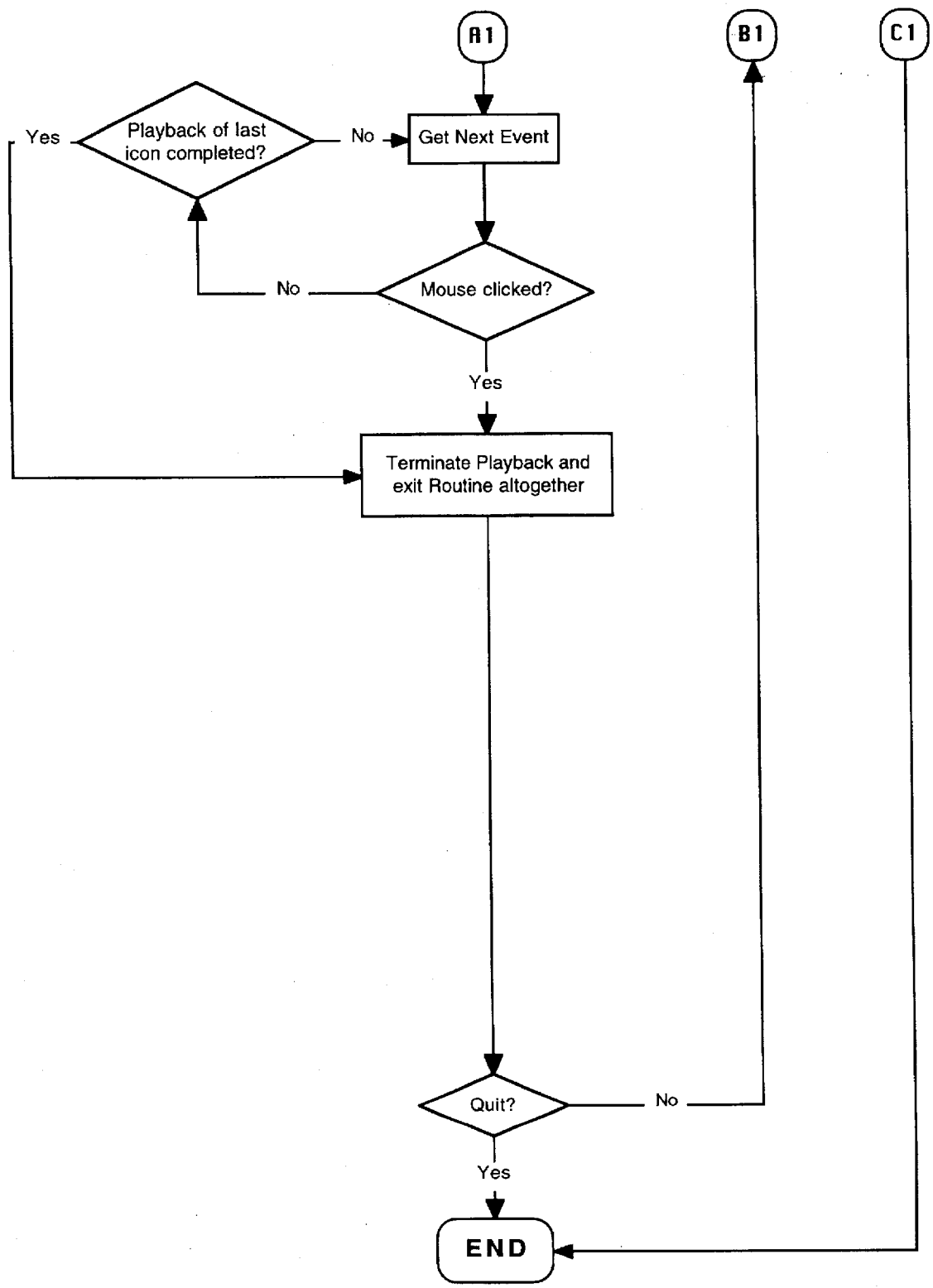

FIG. 14 is a flow chart showing the method of FIG. 6.

FIG. 7 illustrates a method which can assist users in doing two different but useful things: 1) get information to help them establish their location within a tree structured hierarchical graphic database; and 2) expedite the process of navigating quickly up the database tree to reach a higher level. The method involves the use of a special window, which we call the Elevator and which appears in FIG. 7 as the narrow gray vertical strip along the left-hand edge of the screen display. The area which we discuss here is the portion of the Elevator that lies beneath the horizontal line that demarcates the Tolfa icon region at top; it is this larger lower region in which icons may be dynamically updated to help with orientation and navigation. The use of the Elevator column is illustrated in the sequence of drawings of FIG. 7. In Drawing #1 of FIG. 7, the user is at the top-most level of the data base tree, and is shown double clicking on the "Things" icon in order to display the items found within that category. In Drawing #2 of FIG. 7, we have opened up the "Things" category, and are viewing the three domains in which various physical objects are located (i.e., the house, the hospital, and the school); in the Elevator column, we see a newly-posted small icon of "Things", which graphically shows what category we opened to reach the current level. This protocol of posting a small icon beneath the currently-displayed icons in the Elevator column, whenever a category is opened, is followed consistently as a user graphically navigates his way down the data structure, as iteratively shown in Drawings #2 through #4. In Drawing #2, for example, the user is double-clicking on the "Home" icon to open it up; in Drawing #3, we have opened up onto a floorplan of the home, and we now see a newly-posted small version of the "Home" icon in the Elevator column immediately beneath the previously-posted "Things" icon. In Drawing #3, the user is double-clicking on the "Kitchen" icon to open it up; in Drawing #4, we have opened onto a view of the kitchen proper with its contents, and additionally we see a newly posted small version of the "Kitchen" icon in the Elevator column immediately beneath the previously-posted "Things" and "Home" icons. And so on: each time we double-click on a category and open it, a small version of that opened icon is appended to the end of the sequence of small icons in the Elevator. The resulting Elevator display can be useful by allowing a user to remind himself of the access path to the current display, or to help him in identifying what the current display in the Picture Gallery represents, given the categories of which it is a subcategory.

The second and other way in which the small icons in the Elevator column provide benefit to the user is by giving him expedited access to each of the superordinate levels. It does this by serving not only as a display area, but also as a control area, as Drawings #5 and #6 of FIG. 7 illustrate. Drawing #5 shows the Picture Gallery displaying the kitchen contents (as in Drawing #4 also). In this drawing, however, the user is shown clicking on one of the small icons in the Elevator column—in this case, on the icon for "Home". The response of the system to this input from the user is—as is shown in Drawing #6 of FIG. 7—to bring up in the Picture Gallery the display of the level which contains the icon clicked by the user, updating of course the Elevator column to reflect this level's place in the data structure. In general, the user can return to any superordinate level lying between the data base tree's root node and current display node, simply by clicking on the appropriate small icon in the Elevator column. If the user wished to backtrack his steps one level at a time, then he can simply adopt the strategy of always clicking on the bottommost icon in the elevator column. If, on the other hand, he wishes to leap quickly from the current level to some significantly higher level in the data base tree, he can do so at a single click. This is a powerful shortcut for users who are graphically navigating through the database.

Figure 15A:
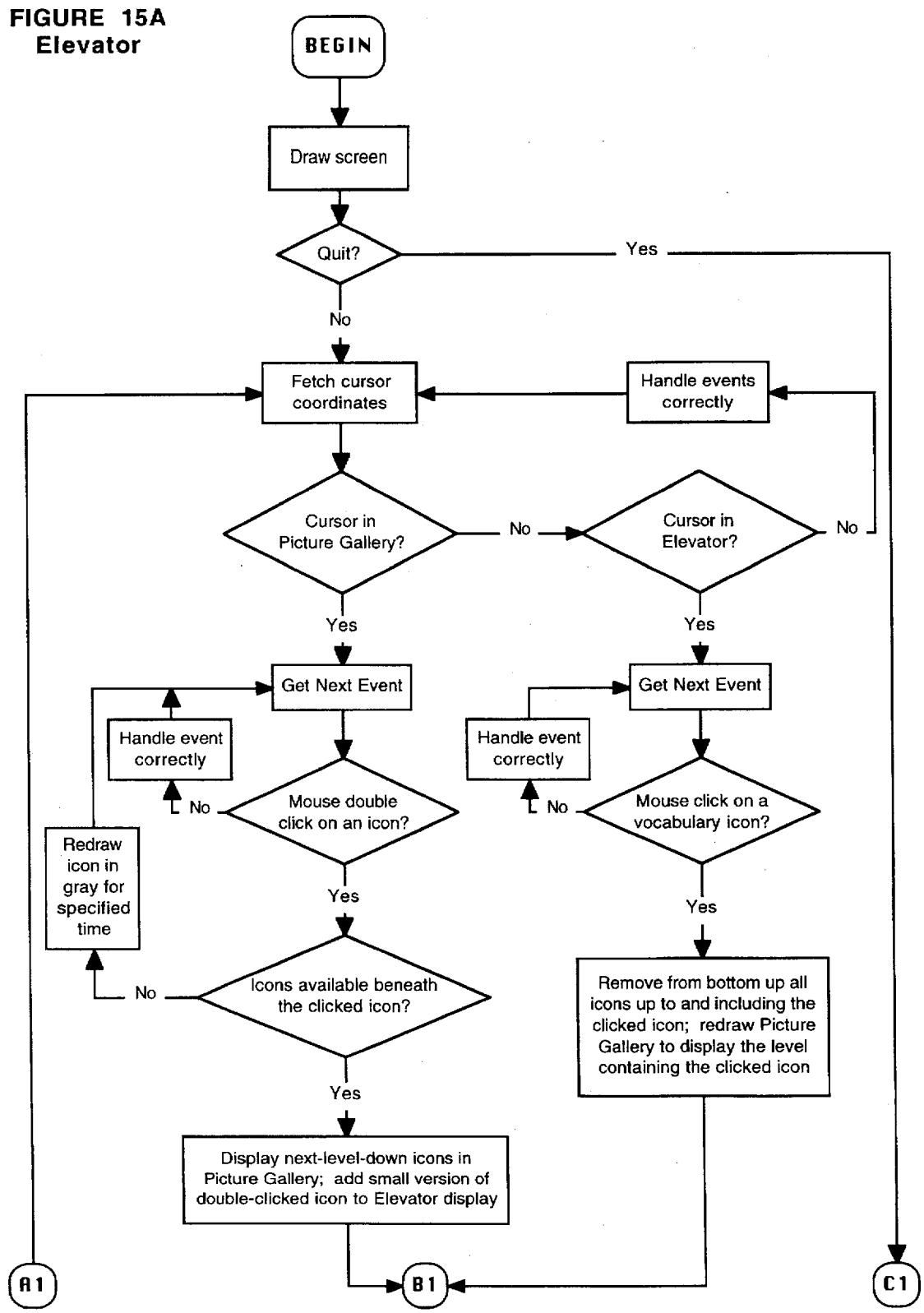
Figure 15B:
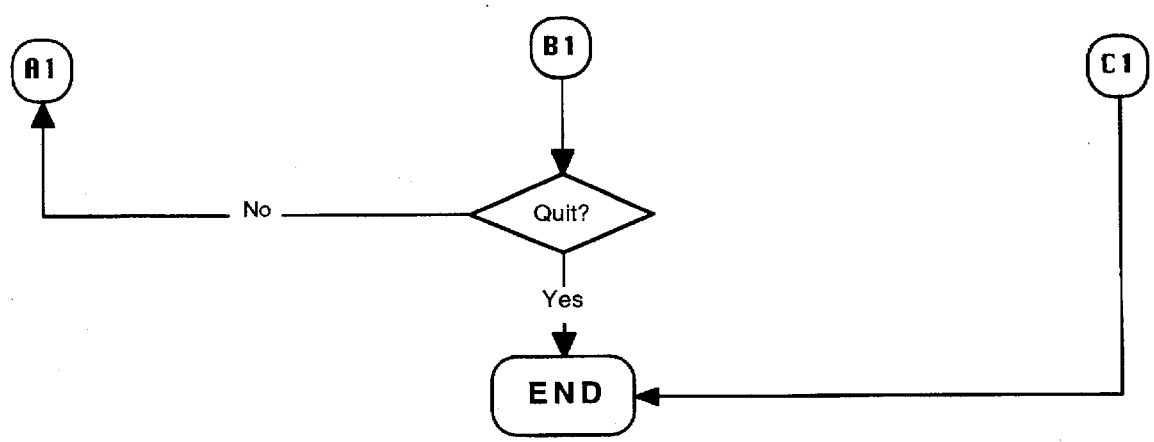

FIG. 15 is a flow chart showing the method of FIG. 7.

FIG. 8, 9, and 10 illustrate three ways in which persons with partially spared (or unimpaired) language performance can utilize their linguistic skills to expedite the retrieval of icons into Storyboards. In each of these examples, it is assumed that the user will be able to activate keys on the standard computer keyboard; however, the particular means of operating the keyboard is immaterial. As long as the user has sufficient linguistic competence, and can activate his chosen sequence of keys on the keyboard—be it with two hands, one hand, mouthstick, or via other assistive technology—the methods described below are available to him. By design, the methods of FIGS. 8, 9, and 10 are limited to working on single glosses or gloss fragments (i.e., single, uninterrupted alphanumeric strings) at a time. In practice, this means that users work with one word-concept at a time, not sentences. This has been found effective in appropriately scoping the tasks and effort levels of aphasic persons who are using these methods.

FIG. 8 illustrates the way in which a user may search through a chosen domain to search for all icons whose glosses contain a desired sequence of letters, anywhere within them. First of all, the user must bring into view in the Picture Gallery the domain through which he wishes to search. For example, if he wishes to search through the Kitchen (a natural place to look for food items, cooking utensils, many appliances, etc.), he must bring that domain up for viewing in the Picture Gallery, as Drawing #1 of FIG. 8 illustrates. There are three ways to confirm success in this task: first and foremost, one looks for an appropriate display of kitchen appliances, furnishings, and other such paraphernalia in the display area of Picture Gallery; second, one checks that the lowermost icon in the Elevator column at left displays a small image of the "Kitchen", indicating that this is the most recently opened category; and third (for persons with adequate linguistic skills), one checks to find the category identified by word in the title bar, here shown displaying the legend "Picture Gallery: kitchen".

Once the user has brought the desired category into view in the Picture Gallery, he activates the "text" button in a Storyboard—the button in the lower left hand corner of the Storyboards, showing the characteristic "I-beam" text cursor. Clicking on this button turns the specified Storyboard into the active window, and prepares the text area to the right of the button to receive new text from the keyboard (automatically replacing any previously displayed text in that area). At this point, the user types in his desired letter sequence, signaling the end of the sequence by pushing the <Carriage Return>. The search string may contain any number of letters whatever, from a single letter to a string of arbitrary length. We illustrate the search string specification also in Drawing #1 of FIG. 8: the text area contains the three-letter string entered by the user.

The computer responds to the <Carriage Return> by initiating the search. The program compares the gloss of every icon at the relevant levels—the displayed level and every subordinate level to see whether the specified letter sequence occurs anywhere within the gloss. By design, the search is case-insensitive, meaning that searching for the capital letter string will achieve exactly the same results as searching for the lowercase letter string. While the search is in progress, the cursor turns into a small rotating circle divided into black and white quadrants (the "beachball"), to indicate that the processor is executing the specified task. If no matches are found, the system returns simply an audible "beep' after rejecting the final candidate.

If the search does succeed, then each time the program finds a match, it posts a copy of that icon to the Storyboard buffer, ready for display. When the search has been completed, the program redraws the Storyboard, displaying all the icons which have just been posted to the Storyboard buffer. We see the results in Drawing #2 of FIG. 8. The search sequence found successful matches in four different berries ("raspberry", "blueberry", "blackberry", "strawberry") and one vegetable ("cucumber"). If indeed the user had wanted to single out just berries for inspection, and if he had the requisite linguistic abilities, he could have winnowed out the "cucumber" by searching for the longer string. This observation underscores an important point: the more letters the user can accurately specify in the search string, the fewer false returns (from his point of view) will appear. Nonetheless, even for persons with considerable linguistic deficits, this ability can still be a useful and powerful method of accessing icons, since it provides complete graphic linguistic returns to partial linguistic inputs, while furthermore allowing the user to limit the search domain via graphic navigation.

Figure 16B:
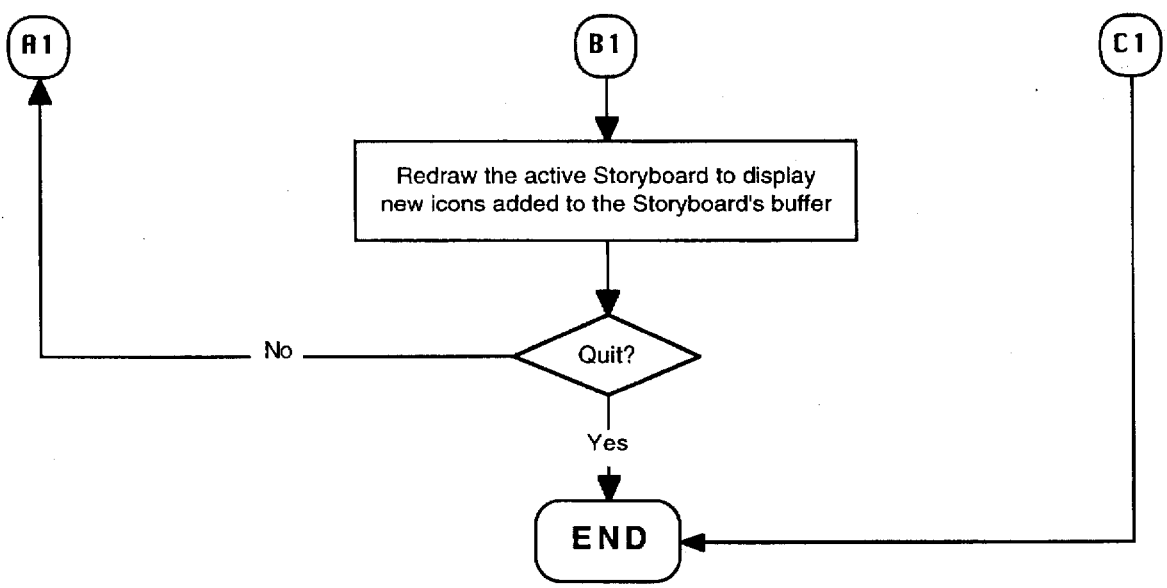

FIG. 16 is a flow chart showing the method of FIG. 8.

FIG. 9 illustrates a specialization of the method discussed immediately above. FIG. 9 illustrates the way in which a user may search through a chosen domain to search for all icons whose glosses begin with (rather than contain) a desired sequence of letters. Here too, the user must first bring into view in the Picture Gallery the domain through which he wishes to search. For example, if he wishes to search through the Kitchen (a natural place to look for food items, cooking utensils, many appliances, etc.), he must bring that domain up for viewing in the Picture Gallery, as Drawing #1 of FIG. 8, discussed above, illustrates. The three methods discussed above under FIG. 8, for confirming success in this task, hold here as well.

Once the user has brought the desired category into view in the Picture Gallery, he activates the "text" button in a Storyboard—the button in the lower left hand corner of the Storyboards, showing the characteristic "I-beam" text cursor. Clicking on this button turns the specified Storyboard into the active window, and prepares the text area to the right of the button to receive new text from the keyboard (automatically replacing any previously displayed text in that area). At this point, the user types in an initial quotation mark (either single—[']—or double—["]), followed by his desired letter sequence, then signals the end of the sequence by pushing the <Carriage Return>. The quotation mark in the initial position is obligatory: it stipulates that the search string must stand at the beginning of a gloss for a successful match. The subsequent letter string may contain any number of characters whatever, from a single letter to a string of arbitrary length. We illustrate the search string specification in Drawing #1 of FIG. 9: the text area contains the four-character string "spo (beginning with ["]), entered by the user.

The computer responds to the <Carriage Return>by initiating the search. The program compares the gloss of every icon at the relevant levels—the displayed level and every subordinate level to see whether the specified letter sequence occurs at the beginning of the gloss. By design, the search is case-insensitive, meaning that searching for the capital letter string will achieve exactly the same results as searching for the lowercase letter string "spo. While the search is in progress, the cursor turns into a small rotating circle divided into black and white quadrants (the "beachball"), to indicate that the processor is executing the specified task. If no matches are found, the system returns simply an audible "beep" after rejecting the final candidate.

If the search does succeed, then each time the program finds a match, it posts a copy of that icon to the Storyboard buffer, ready for display. When the search has been completed, the program redraws the Storyboard, displaying all the icons which had just been posted to the Storyboard buffer. We see the results in Drawing #2 of FIG. 9. The search sequence "spo returned successful matches in three instances, sports_news, spoon, and sponge, all of which begin with spo. The location of the three items is illustrative. The sponge is in plain view in the kitchen, sitting atop the sink off to the right. The sports_news is not in view, but its parent icon, the "newspaper" is, lying atop the kitchen table; double-clicking on the icon displays the various sections of the newspaper, one of which is the sports_news. Finally, the spoon is not only not in view, but even its parent icon, a kitchen drawer, is off-screen, to the right of the sink. In order to get to the spoon via graphic navigation, one first must activate the Picture Gallery, then scroll to the right to bring the appropriate drawer into view, and then double-click on the drawer. For users with the requisite linguistic abilities to type "spo, this strategy may well be preferred to graphic navigation as an efficient way to retrieve the icon for "spoon".

Figure 17B:
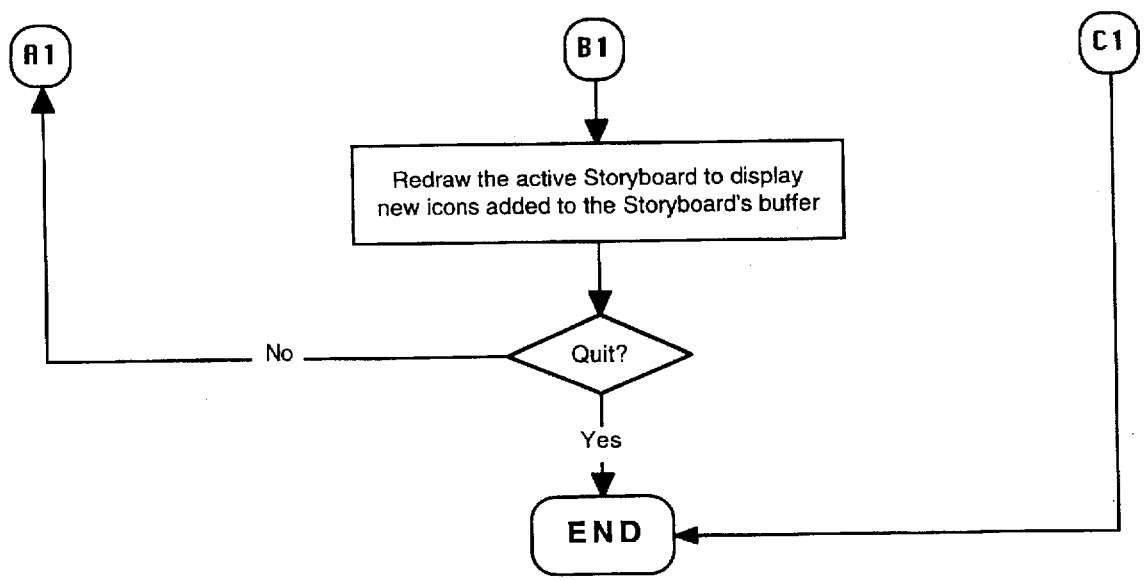

FIG. 17 is a flow chart showing the method of FIG. 9.

FIG. 10 illustrates the way in which a language-competent user, such as a speech therapist, hospital staff, or unimpaired family member, may search through the data-base for icons with specific glosses. Since the assumption in this usage mode is that the initiator of the action is not language-disadvantaged, the search domain by design is extended to include the entire data-base, and not just those icons found at or below the domain being displayed at the time in the Picture Gallery. We illustrate this in FIG. 10, in which the user wishes to produce the icon associated with the gloss "spoon", but has displayed in the Picture Gallery an entirely unrelated domain, namely that of non-family persons likely to be found in or around one's home.

To initiate such a full-data-base search, one first activates the "text" button in a Storyboard, just as in the two methods discussed immediately above. As there, the desired button is found in the lower left hand corner of the Storyboards, showing the characteristic "I-beam" text cursor. Clicking on this button turns the specified Storyboard into the active window, and prepares the text area to the right of the button to receive new text from the keyboard (automatically replacing any previously displayed text in that area). At this point, the user types in the desired gloss, enclosed in quotation marks (either single—[']—or double—["]). This is illustrated in Drawing #1 of FIG. 10: here the user has typed the word 'spoon', enclosing it between two single quotation marks to specify an exact-match search. To launch the search, the user hits the <Carriage Return> after typing in the final quotation mark.

The computer responds to the <Carriage Return> by initiating the search procedure. The program starts the search at the highest level in the database tree, and moves systematically through the database comparing the gloss of every single icon in turn with the string contained between the quotation marks. By design, the search is case-insensitive, so that searching for the upper-case gloss "SPOON" will yield exactly the same results as searching for the lowercase gloss "spoon". While the search is in progress, the cursor turns into a small rotating circle divided into black and white quadrants (the "beachball"), to indicate that the processor is executing the specified task. If no matches are found, the program simply returns an audible "beep" after the last candidate has been rejected.

Whenever the program finds a match, it posts a copy of that icon to the Storyboard buffer, ready for display. When the search has been completed, the program redraws the Storyboard, displaying whatever icons have just been posted to the Storyboard buffer. This is illustrated in Drawing #2 of FIG. 10. Here the search has located an icon whose gloss is spoon (an exact match with the target search string) and the icon plus its gloss are displayed in the Storyboard at the conclusion of the search procedure. (If Text Display were turned OFF, then the icon alone would appear in the Storyboard, without the gloss being displayed in the text area beneath.)

Two points should be emphasized regarding this method of exact match search. First, typing the final quotation mark represents the key event that identifies this as a search for an exact match with a gloss, for the program assumes that any user who is sufficiently confident to complete a word with a quotation mark must be language-competent. In working with the population of aphasic users, this assumption is in fact borne out in practice. The second point is that whatever is included between the two quotation marks must be exactly correct, insofar as alphanumeric characters, other typed symbols, and their orderings are concerned; the sole liberty one may take is to replace lower-case letters with upper-case letters, and vice versa. Other than that, the match must be precise. If a user wants to retrieve decaffeinated_coffee, for example, via an exact search of this type, then he must get all 20 characters—including the underscore [_]—exactly right; otherwise there will be no exact match, and the search will return an audible "beep" rather than an icon. In this case, a successful strategy would be to search for "decaf (indicating that the gloss must begin with the specified letters) or simply for decaf (indicating that the gloss must simply contain the specified letters), either of which would return decaffeinated$_{13}$coffee. Into the same category falls the scenario of searching for "phone" in the attempt to retrieve the icon for telephone; again, an exact search for "phone" will fail, though a search for icons containing phone will succeed. In short, the exact word search method is most powerful and useful for persons who are familiar with the system vocabulary and who know that their search targets exist with the glosses that they remember.

Figure 18A:
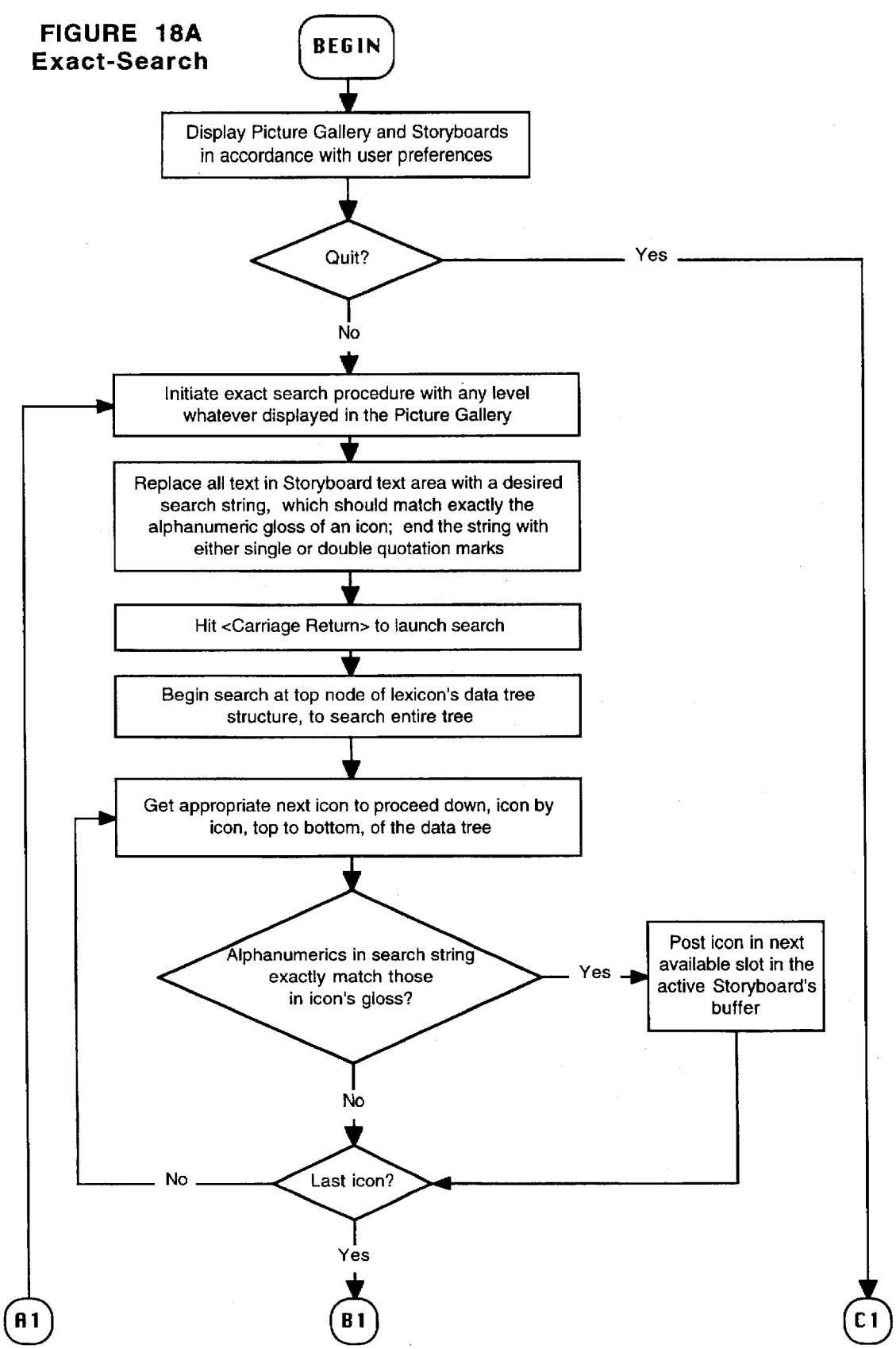
Figure 18B:
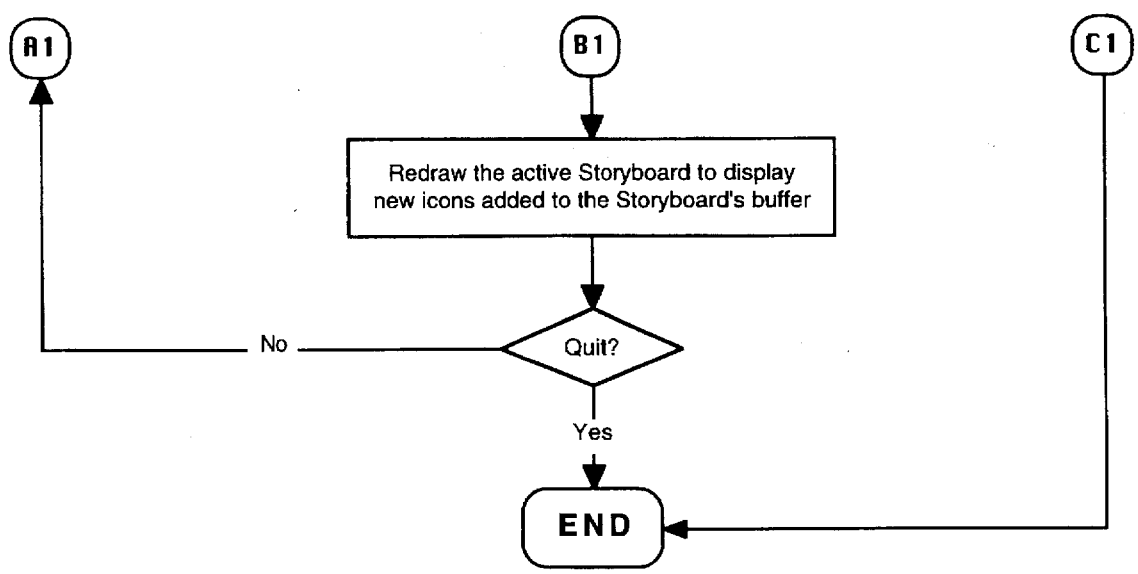

FIG. 18 is a flow chart showing the method of FIG. 10.

As can be seen from the foregoing, the method of the present invention by using a computer and a display and a pointing device facilitates the communication process when language-disadvantaged individuals are involved, while simultaneously enhancing interactions between the computer-based system and individual users who are engaged in that communication process.

What is claimed is:

1. A method of communicating to a user of a computer with a display means and a pointing device for visually indicating a position, through a cursor means, on the display means, said method comprising the steps of:

generating a plurality of icons, each icon being actively manipulatable by the user;

displaying the plurality of icons on the display means;

moving the cursor means on the display means by the user through the pointing device to a desired one of said plurality of icons, said desired one icon, having a first size, and a first spatial orientation of an image, is displayed at a desired location on said display means;

actively manipulating said desired one icon;

displaying a first representation of said desired one icon in place of said desired one icon, said first representation of said desired one icon having a second size larger than said first size of said desired icon, and having said first spatial orientation of said image, and then resuming the display of the plurality of icons, excluding said desired one icon, with a second representation of said desired one icon, having a third size which is smaller than said second size and larger than said first size, replacing said first representation of said desired one icon, on the display means.

2. The method of claim 1 wherein a first representatoin of said desired one icon is displayed in a rectangle.

3. The method of claim 2 wherein the plurality of images are displayed at said desired location.

4. The method of claim 1 wherein said first representation of said desired one icon is displayed in a rectangle.

5. The method of claim 1 wherein said resuming step displays the plurality of icons after a period of pre-determined delay.

6. The method of claim 1 wherein said resuming step displays the plurality of icons immediately after the user activates the pointing device.

7. The method of claim 1 further comprising the additional step of:

displaying said second representation of said desired one icon after said active manipulation step.

8. A method of communicating language oriented information to and from a user, by a computer with a display having a pointing device for visually indicating a position, through a cursor means, on the display, said method comprising the steps of:

generating a plurality of icons by the computer, each of said plurality of icons is a graphical representation of different language information;

displaying said plurality of icons generated on the display;

moving the cursor means on the display by the user, through the pointing device to a desired one of said plurality of icons, said desired one icon, having a first size and a first spatial orientation of a first image, and is displayed on the display at a desired location;

actively manipulating said desired one icon by the user;

displaying a second image, representing language information of said desired one icon, in response to the selection of said desired one icon, said second image having a second size, larger than said first size of said desired one icon, and being of said first spatial orientation of said first image;

resuming the display of the plurality of icons, excluding said desired one icon, with a representation of said desired one icon having a third size, smaller than said second size and larger than said first size, displayed at the desired location, on the display; and then outputting said language information of said desired one icon.

9. The method of claim 8 wherein said resuming step displays the plurality of icons after a period of pre-determined delay.

10. The method of claim 8 wherein said resuming step displays the plurality of icons immediately after the user activates the pointing device.

11. The method of claim 8 wherein said image is displayed in a rectangle.

12. The method of claim 8 wherein said outputting step comprises:

audibly outputting the language information which is represented by said desired one icon.

13. The method of claim 8 wherein said outputting step comprises:

displaying the language information which is represented by said desired one icon.

14. The method of claim 8 wherein a plurality of images are displayed.

15. The method of claim 14 wherein the plurality of images are displayed in the desired location.

16. A method of communicating language oriented information to a user by a computer with a display having a pointing device for visually indicating a position, through a cursor means, on the display, said method comprising the steps of:

generating a plurality of icons, each icon having at least one image, representing language information of said icon, associated therewith, said one image being larger in size than each of its associated icon;

generating a plurality of text words each word associated with one icon;

displaying the plurality of icons and words; and displaying an activatable control icon having a selectable range between two ends, wherein at one end, activation of said control icon causes a display of all the images associated with each icon and an audio output of each of the text words associated with each icon, and at other end, activation of said control icon causes an audio output of each of the text words associated with each icon, with a display of each of the images associated with each icon being truncated.

17. A method of communicating to a user of a computer with a display means and a pointing device for visually indicating a position, through a cursor means, on the display means, said method comprising the steps of:

generating a plurality of icons, each icon being actively manipulatable by the user;

displaying the plurality of icons on the display means;

moving the cursor means on the display means by the user through the pointing device to a desired one of said plurality of icons, said desired one icon, having a first size and a frame with a first thickness, is displayed at a desired location on said display means;

actively manipulating said desired one icon;

displaying a first representation of said desired one icon in place of said desired one icon, said first representation of said desired one icon having a second size larger than said first size of said desired icon, and then resuming the display of the plurality of icons, excluding said desired one icon, with a second representation of said desired one icon, having a third size smaller than said second size and a frame with a second thickness thicker than said first thickness, replacing said first representation of said desired one icon, on the display means.

18. The method of claim 17 further comprising the additional step of:

displaying said second representation of said desired one icon after said active manipulation step.

19. A method of communicating to a user of a computer with a display means and a pointing device for visually indicating a position, through a cursor means, on the display means, said method comprising the steps of:

generating a plurality of icons, each icon being actively manipulatable by the user;

displaying the plurality of icons on the display means;

moving the cursor means on the display means by the user through the pointing device to a desired one of said plurality of icons, said desired one icon, having a first size, is displayed at a desired location on said display means;

actively manipulating said desired one icon;

displaying a first representation of said desired one icon in place of said desired one icon, said first representation of said desired one icon having a second size and a frame with a first thickness, then resuming the display of the plurality of icons, excluding said desired one icon, with a second representation of said desired one icon, having a third size smaller than said second size and a frame with a second thickness thicker than said first thickness, replacing said first representation of said desired one icon, on the display means.

20. The method of claim 19 further comprising the additional step of:

displaying said second representation of said desired one icon after said active manipulation step.

* * * * *